(12) United States Patent
Myers et al.

(10) Patent No.: US 9,021,006 B2
(45) Date of Patent: Apr. 28, 2015

(54) INTELLIGENT VIDEO NETWORK PROTOCOL

(75) Inventors: Gary Myers, Aldie, VA (US); Robert A. Cutting, Reston, VA (US); Ethan Shayne, Gainsville, VA (US); Andrew Martone, San Francisco, CA (US); David V. Conger, Sterling, VA (US); James Morris, Herndon, VA (US); William Aldrich, Vienna, VA (US); Michael C. Mannebach, Fairfax, VA (US); Chung-Cheng Yen, Clifton, VA (US); Nathan D. Borrebach, Portland, OR (US); Satyajeet S. Hoskote, Vienna, VA (US); Alan J. Lipton, Herndon, VA (US)

(73) Assignee: Avigilon Fortress Corporation, Vancouver (CA)

( * ) Notice: Subject to any disclaimer, the term of this patent is extended or adjusted under 35 U.S.C. 154(b) by 1748 days.

(21) Appl. No.: 12/155,476

(22) Filed: Jun. 4, 2008

(65) Prior Publication Data
US 2009/0158367 A1  Jun. 18, 2009

Related U.S. Application Data

(60) Provisional application No. 61/064,893, filed on Apr. 1, 2008, provisional application No. 60/924,872, filed on Jun. 4, 2007.

(51) Int. Cl.
*G06F 15/16* (2006.01)
*H04L 29/08* (2006.01)
*G06F 9/54* (2006.01)

(52) U.S. Cl.
CPC ............. *H04L 67/025* (2013.01); *G06F 9/54* (2013.01)

(58) Field of Classification Search
CPC .......................... G06F 9/54; H04L 67/025
USPC ............................................. 709/201
See application file for complete search history.

(56) References Cited

U.S. PATENT DOCUMENTS

| | | | |
|---|---|---|---|
| 6,646,676 B1* | 11/2003 | DaGraca et al. | 348/155 |
| 2007/0013776 A1* | 1/2007 | Venetianer et al. | 348/143 |
| 2007/0291118 A1* | 12/2007 | Shu et al. | 348/156 |
| 2008/0005290 A1* | 1/2008 | Nykanen et al. | 709/222 |
| 2010/0250695 A1* | 9/2010 | Shenfield et al. | 709/206 |

OTHER PUBLICATIONS

Chan et al. Devices Profile for Web Services. Feb. 2006.*
Brown et al. IBM Smart Survaillance System (S3): An open and extensible architecture for smart video surveillance. IBM 2005.*
Haas. Web Services Glossary. W3C Working Group Note 11, Feb. 2004.*

(Continued)

*Primary Examiner* — Bryan Lee
(74) *Attorney, Agent, or Firm* — MH2 Technology Law Group LLP

(57) ABSTRACT

Software capabilities of a video analytics device are obtained. The software of the video analytics device is configured. An output from the video analytics device is received. The output is sent to a user device.

16 Claims, 4 Drawing Sheets

(56) References Cited

OTHER PUBLICATIONS

Flexible Surveillance System Architecture for Prototyping Video Content Analysis Algorithms, R.G.J. Wijnhovena, E.G.T. Jaspersa, P.H.N. de With. Eindhoven University of Technology, Eindhoven, The Netherlands. 2006.*

On the Use of Real-Time Agents On the Use of Real-Time Agents in Distributed Video Analysis Systems. B. Lienard, A. Hubaux, C. Carincotte, X. Desurmont and B. Barrie. Multitel ASBL, Parc Initialis, rue Pierre et Marie Curie, 2, B-7000, Mons, Belgium. 2007.*

* cited by examiner

INTELLIGENT VIDEO NETWORK PROTOCOL

CROSS-REFERENCE TO RELATED PATENTS AND PUBLICATIONS

The following patents and publications, the subject matter of each is being incorporated herein by reference in its entirety, are mentioned:

U.S. Published Patent Application No. 2005/0146605, published Jul. 7, 2005, by Lipton et al., entitled "Video Surveillance System Employing Video Primitives;"

U.S. patent application Ser. No. 11/390,498, filed Mar. 28, 2006, by Scanlon et al., entitled "Automatic Extraction of Secondary Video Streams,".

This application claims priority from U.S. Provisional Patents Application Nos. 60/924,872, filed Jun. 4, 2007 and 61/064,893 filed Apr. 1, 2008, both of which are incorporated herein by reference.

BACKGROUND

The present application relates to network systems. More specifically, it relates to protocols for video analytics for a general video system and will be described with a particular reference thereto. It should be appreciated, however, that the following is also applicable to other like applications.

Today, video analytics software is being used for a wide variety of purposes on numerous platforms. The spectrum of usage currently ranges from video surveillance systems to video-based business intelligence systems to video-based automation systems on platforms such as cameras, encoders, routers, digital video recorders (DVR), personal computers (PC) and specialized video-based devices. However, there is no common mechanism to allow interoperability between the devices, video management software, and other systems as well as device-to-device communication.

There is a need for a common protocol to make integration easier between the devices and applications.

SUMMARY

One embodiment of the invention may include a computer-readable medium comprising software that, when executed by a computer, causes the computer to perform a method comprising: obtaining software capabilities of a video analytics device; configuring the software of the video analytics device; receiving an output from the video analytics device; and sending the output to a user device.

Finalize once claims in final form

BRIEF DESCRIPTION OF THE DRAWINGS

The foregoing and other features of various embodiments of the invention will be apparent from the following, more particular description of such embodiments of the invention, as illustrated in the accompanying drawings, wherein like reference numbers generally indicate identical, functionally similar, and/or structurally similar elements.

DEFINITIONS

Figure 1:
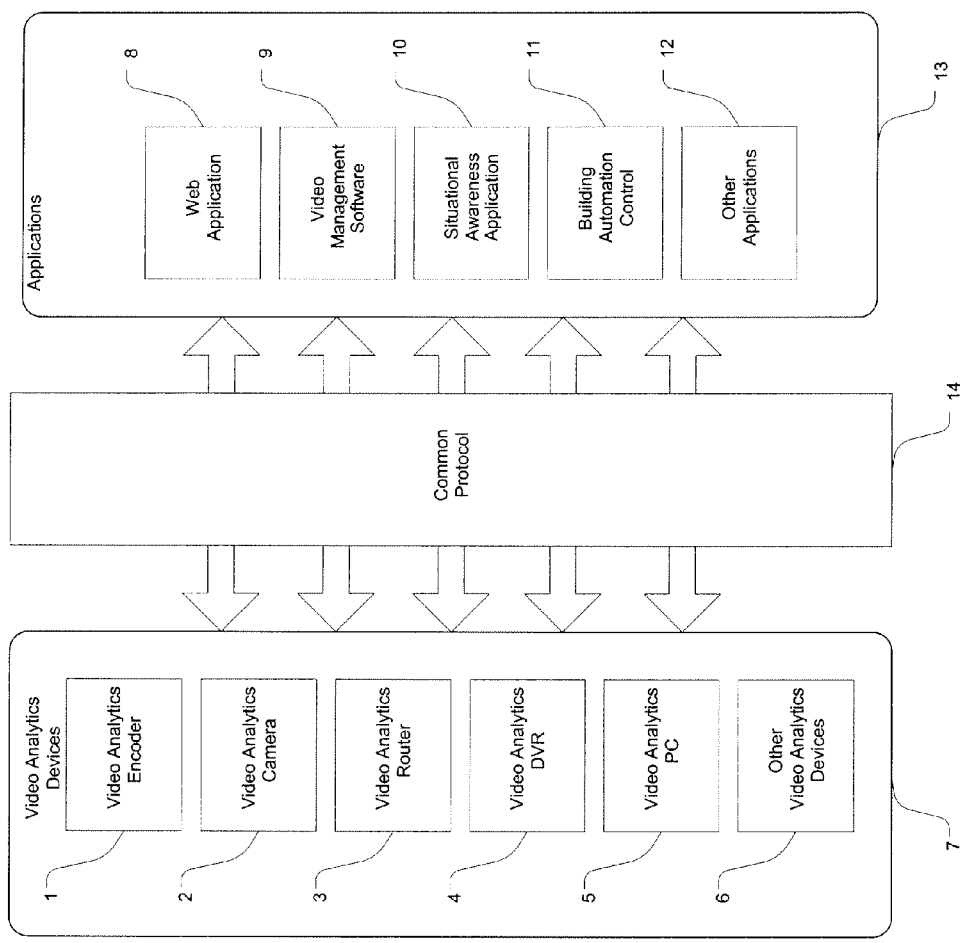
FIG. 1 illustrates an exemplary embodiment of the invention.

In describing the invention, the following definitions are applicable throughout (including above).

"Video" may refer to motion pictures represented in analog and/or digital form. Examples of video may include: television; a movie; an image sequence from a video camera or other observer; an image sequence from a live feed; a computer-generated image sequence; an image sequence from a computer graphics engine; an image sequences from a storage device, such as a computer-readable medium, a digital video disk (DVD), or a high-definition disk (HDD); an image sequence from an IEEE 1394-based interface; an image sequence from a video digitizer; or an image sequence from a network.

A "video sequence" may refer to some or all of a video.

A "video camera" may refer to an apparatus for visual recording. Examples of a video camera may include one or more of the following: a video imager and lens apparatus; a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation and/or analysis of video, including, for example, compression, editing, surveillance, and/or verification.

A "frame" may refer to a particular image or other discrete unit within a video.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that may store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION OF EXEMPLARY EMBODIMENTS

In describing the exemplary embodiments of the present invention illustrated in the drawings, specific terminology is employed for the sake of clarity. However, the invention is not intended to be limited to the specific terminology so selected. It is to be understood that each specific element includes all technical equivalents that operate in a similar manner to accomplish a similar purpose. The exemplary embodiments are described and illustrated as non-limiting examples.

A video analytics or intelligent video network protocol may provide a mechanism for interoperability between cameras, encoders, routers, digital video recorders (DVR), personal computers (PC) and specialized video-based devices used in various imaging applications. The protocol may, for example, define a common way to:

Obtain video analytics software capabilities. Since there are a wide variety of applications for video analytics the software will report the analytics capabilities supported by the device. This would also include the capabilities of the protocol as well (communication channels, extensions, etc.).

Configure the video analytics software. This includes configuration options, behavior definitions (rules), and actions to perform when a defined behavior occurs. The types of supported options and behaviors are reported as part of the capabilities.

Receive output from the video analytics software. This may vary based on capabilities supported but may include simple information such as a binary value for whether people are in the video or more complex information such as snapshots, video clips (or other imagery) and descriptions of the behavior identified.

This data may include object tracking data that may be used by other devices to "hand-off" targets as described, for example, in U.S. patent application Ser. No. 11/390,498, identified above.

This data may include metadata such as video primitives which enable complex distributed applications. The generation of video primitives is described, for example, in U.S. Published Patent Application No. 2005/0146605, identified above.

This data may include alert data that describes a particular event of interest that has been detected, such as a person breaching a perimeter, an occupant count in an area breaking a threshold, a vehicle parking in an illegal space between 10 pm and 5 am on a weekend, and so on This data may include "counting" data such as a continuous signal indicating the number of people in a space, or the number of vehicles that has entered a parking facility, and so on.

Discover video analytics devices automatically or through a manual process.

Provide authentication and authorization support to prevent unauthorized use of the video analytics software.

Provide video analytics software status information. The software may provide status information that may be used to monitor the current state of the analytics.

Provide logging support. This allows the video analytics software to provide meaningful data so that application may log or act upon.

Provide device-to-device communication to enable distributed applications.

Provide device-to-central-application communications to enable:

Multiple devices to be managed from a single enterprise application

Data from multiple devices to be integrated so as to provide more complex analytics capabilities Provide a mechanism for device software/firmware/license upgrades and maintenance.

As shown in FIG. 1, block 7 shows the variety of video analytics devices that may communicate through a common protocol (block 14) from the applications defined in block 13. The devices 7 may include, for example, a video analytics encoder 1, a video analytics camera 2, a video analytics router 3, a video analytics DVR 4, a video analytics PC 5, or other video analytics devices 6. The applications 13 may include, for example, web applications 8, video management software 9, situational awareness application 10, building automation control 11, or other applications 12.

An exemplary embodiment of an exemplary video analytics protocol may use HyperText Transfer Protocol (HTTP) as the underlying transport protocol in an Internet Protocol (IP) based network. Each video analytics device may host a web server that hosts an Extensible Markup Language (XML) based Application Programming Interface (API) providing the functionality listed above. Examples of other embodiments may include other transport protocols such as SIP, RTSP, and SNMP. Examples of other embodiments may include other data formats in addition to the format described such as JSON, SOAP, binary or text. The communication channel could be socket-based (examples includes Ethernet and WiFi) or Bus-based (examples includes PCI, USB, SPI, PCIExpress, and Shared Memory).

Figure 2:
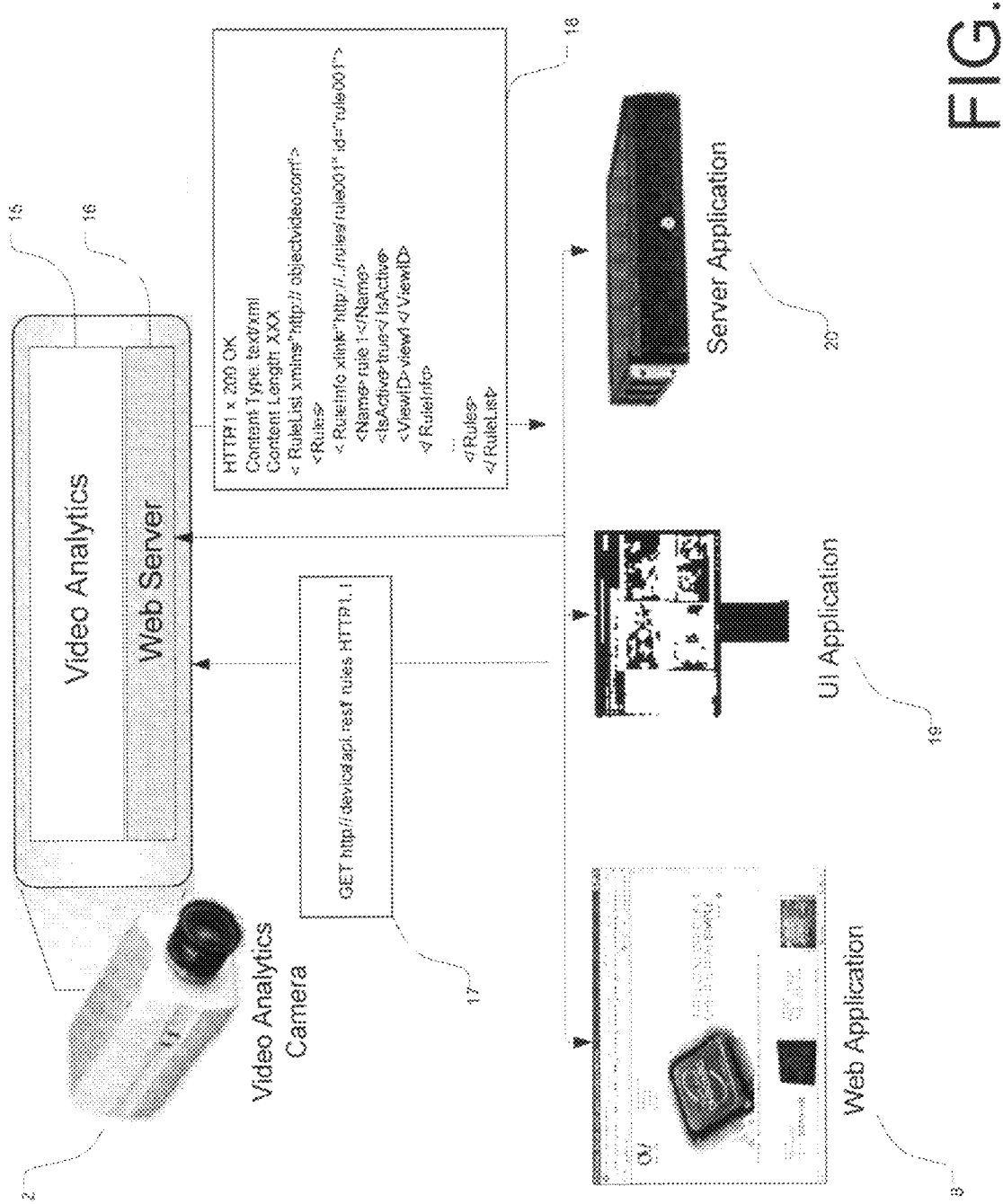
FIG. 2 illustrates an exemplary embodiment of the invention.
Figure 3:
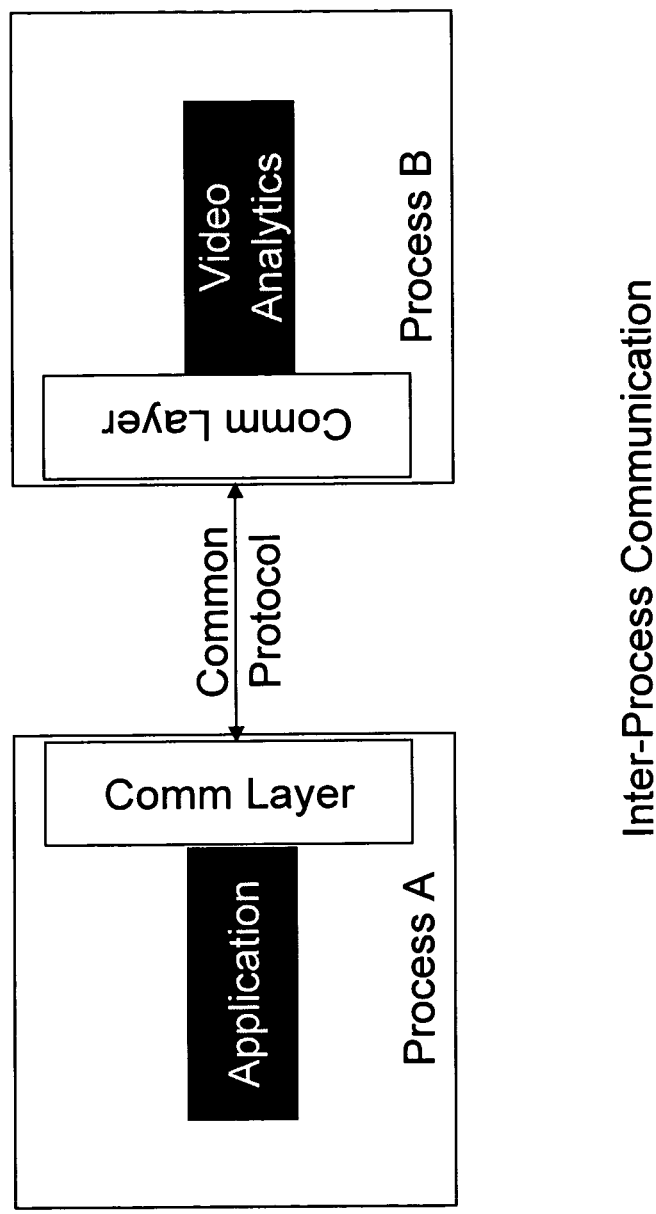
FIG. 3 illustrates an exemplary embodiment of the invention for inter-process communication.
Figure 4:
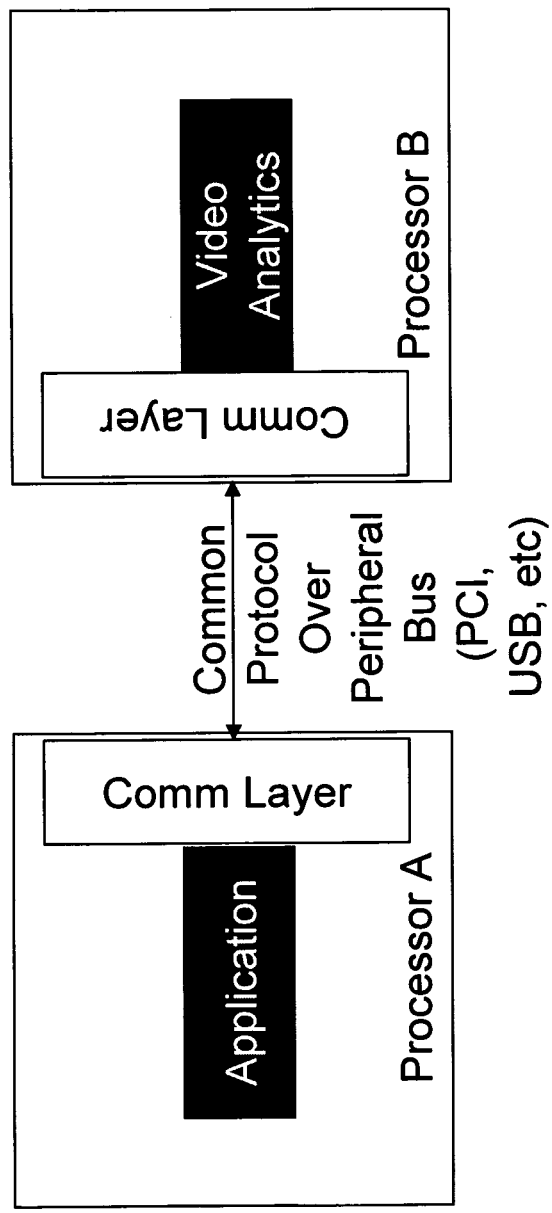
FIG. 4 illustrates an exemplary embodiment of the invention for inter-processor communication.

With reference to FIG. 2, block 2 represents a camera with embedded video analytics software (block 15). Also on the camera is a web server (block 16) that will listen to XML requests (block 17) and respond with XML data (block 18) to various applications (blocks 8, 19, and 20).

Other exemplary embodiments of the invention may include a common protocol between separate processes whether on one processor or separate processors. One process would handle the video analytics and another may include the controlling application. In the case of separate processors, the communication channel would most likely by Bus-based.

Software may enable video analytics to be embedded into different devices such as cameras, encoders, and routers. Each of the devices is commonly deployed as part of a larger solution where the device will be integrated with other applications such as video management solutions and centralized end user interfaces. Embodiments of the invention may enable video analytics to be embedded into different devices such as cameras, encoders, and routers. Commonly deployed as part of a larger solution, each of these devices will be integrated with other applications such as video management solutions and centralized end user interfaces. With the proliferation of these intelligent devices, there is a need for a common protocol to make integration easier between the devices and applications.

The protocol according to an exemplary embodiment of the invention defines a common API to access all compliant devices allowing applications to seamlessly integrate with those intelligent devices designed for video analytics configuration and management.

From a technical perspective, embodiments of the invention define a common protocol using XML over HTTP/HTTPS as shown in the FIG. 1.

This protocol may be similar in nature to Web services but may be geared towards lightweight computing requirements on the device. All configuration and management aspects may be treated as resources utilizing the REpresentational State Transfer (REST) architecture. Support for other data formats (i.e. SOAP or JSON) or transports other than HTTP/HTTPS may also be provided.

This following section details examples of REST APIs. It may be divided into the following sections: 1) Protocol information; 2) Device information and configuration; 3) Analytics capabilities and parameter configuration; 4) View management; 5) Rule management; 6) Alerts and counts; 7) User management; 8) Target data output; 9) Metadata output. Each section contains an exemplary XML snippet providing details on an exemplary XML format.

In addition, embodiments of the invention may enable applications to determine the device capabilities by querying each device. This allows an application to adjust itself according to supported features.

Unique Identifiers

IDs may be defined as an unsigned byte array field of length 16. To allow applications to define the ID format (with the 16 byte constraint), all APIs that add a resource (rule, user, etc.) may optionally provide the ID to create the resource with. If not provided, the device may create an ID.

IDs within each type (Rule, User, View, etc.) should be unique at least on the channel level, but could be unique across devices. If the ID may be not unique across devices, a globally unique ID could be derived by combining the device address and channel ID (or just the channel ID if it may be unique). If the application-generated ID may be not unique within its own type, a status code of 400 may be returned when trying to add a new element with an existing ID. It may be suggested that the channel ID be globally unique.

ID Encoding

While there may be no inherent format to the ID except it being 16 bytes in length, there may be restrictions on how it may be encoded. Because IDs may occur as part of a URI, there may be two ways to encode an ID: either following RFC 3986 or, for pure binary IDs, as a hex string.

RFC 3986 first converts the URI to UTF and then prints the following unreserved characters in the URI without any encoding: A-Z a-z 0-9-._~.

All non-printable or reserved characters may be encoded as a two digit hex value prefixed by a %. For example, a space (ASCII value of 32) may be encoded as %20. This means the value of the ID may be stored internally as 16 bytes, but the XML representation may be up to 48 characters in length if every byte may be encoded.

Because a pure binary ID can contain values that might interfere with the operation of browsers and web servers, hex encoding of the ID may be supported. The ID should begin with 0x (0X may be also acceptable) followed by 16 pairs of hex values. Each hex pair represents a single byte in the ID. For example: 0x3F431245DE67FAC46F9D034CA23AEFD4. The hexadecimal characters A-F can also be represented by a-f. So 0x3f431245de67fac46f9d034ca23aefd4 may be equivalent to the previous ID.

If readable IDs may be desired, it may be recommended that IDs may be created with unreserved, printable ASCII characters. IDs less than 16 bytes in length may automatically be expanded to fill the entire buffer with nulls. Note that because the hex string encoding requires the value to start with a '0x' or '0X', RFC 3986 IDs may not begin with this value. Any IDs starting with '0x' or '0X' should be 32 characters in length and have valid hexadecimal values or an HTTP status code of 400 may be returned.

General Notes

The starting point of all API calls may be /api.rest. This may be rooted at the starting point defined in the protocol response. For floating point numbers, the values can have up to seven digits of precision. For timestamps, there may be up to millisecond precision. For lists of items the naming scheme follows this format: XyzList contains XyzSummary items. XyzSummary has an XLINK attribute pointing to the real Xyz. List and Summary items cannot be modified directly, but may be instead modified through their real underlying items. The XLINK href can be defined with any of the three common URI references: absolute (e.g. http://server/path/more/path), root relative (e.g. /path/more/path), or relative (e.g. path assuming the request was rooted at /path/more). The typical usage should be either root relative (as shown in this document) or absolute as relative places more burden on the clients. In general, all resource names in URIs should be case-sensitive and match the case specified in this document with the exception of hex-encoded IDs (as shown above).

Coordinate System

The coordinates used may be normalized with their values ranging from 0.0000000 to 1.0 with 0,0 being the upper left corner. To calculate image coordinates from the normalized coordinates the following formula may be used: Image X=Normalized X*Image Width Image Y=Normalized Y*Image Height To calculate the normalized coordinates from the image coordinates, the reverse formula may be used. Normalized X=Image X/Image Width Normalized Y=Image Y/Image Height Objects that contain width and height may be normalized as well. To convert the width and height values between normalized and image coordinates, the following formula may be used: // To rectangle width/height in image coordinates Image Rect Width=Normalized Rect Width*Image Width Image Rect Height=Normalized Rect Height*Image Height // To rectangle width/height in normalized coordinates Normalized Rect Width=Image Rect Width/Image Width Normalized Rect Height=Image Rect Height/Image Height To compute the lower-right image coordinates of the rectangle, the following formula may be used: // To rectangle width/height in image coordinates Bottom X=(Normalized Rect Width+Normalized X)*Image Width Bottom Y=(Normalized Rect Height+Normalized Y)*Image Height Conventions For brevity and formatting, the following conventions may be used throughout the document. Text in a URI delimited by [ ] indicates a replacement value. The actual value depends on the resource being addressed, but it may be typically an ID. If a URI contains [channel root], the full URI would be /api.rest/channels/[channel id]. Properties may be in bold text, and property values may be italicized. ID properties may be shortened to be easily readable in this document. For example, RuleID may be listed as "Rule009". The actual ID may differ.

1. Protocol Information

The protocol information describes the capabilities of an implementation on a device. Its purpose may be to provide an application with the basic amount of information to ensure proper communication and support. An example of this XML may be:

```
<?xml version="1.0" encoding="utf-8"?>
<OVReadyProtocol  xmlns:xsi="http://www.w3.org/2001/XMLSchema-
                    instance"
                  xmlns:xsd="http://www.w3.org/2001/XMLSchema"
                  xmlns="http://www.objectvideo.com/schemas/
                    ovready">
   <ProtocolVersion>1.0</ProtocolVersion>
   <Root>/some/location/prefix</Root>
   <SupportedDataFormats>
      <DataFormat>XML</DataFormat>
   </SupportedDataFormats>
   <SupportedTransports>
      <Transport>
         <Type>HTTP</Type>
         <Port>80</Port>
      </Transport>
      <Transport>
         <Type>HTTPS</Type>
         <Port>443</Port>
      </Transport>
   </SupportedTransports>
   <SupportedAuthentications>
      <Authentication>HTTPBasic</Authentication>
      <Authentication>OVSimple</Authentication>
   </SupportedAuthentications>
</OVReadyProtocol>
```

The ProtocolVersion property tells an application which version of the protocol may be being used. Much like HTTP, the intent may be that newer versions may be backwards compatible such that an application can default to the basic level of support. If a higher version may be returned, an application can utilize it to provide better support for the device.

The Root property tells an application where all calls should be rooted. After the defined root path, all API calls start with /api.rest.

The SupportedDataFormats property describes the data formats that may be supported. At a minimum, XML may be required, signifying the XML schemas listed in this document. Other formats such as JSON or SOAP may also be supported.

The SupportedTransports property tells an application which network transports may be supported, such as HTTP or HTTPS.

2. Device Configuration

One of the key components may be the concept of a "device.". Typically a device may be represented by a single IP address. If a physical device has multiple IP addresses, each address may be considered a separate device.

One device can handle multiple video "channels" of analytics. The configuration of a device affects all channels, but the configuration of a single channel does not affect the device.

The device configuration provides the details about the device as a whole. The device configuration may be comprised of read-only and modifiable sections. The whole configuration may be retrieved from the configuration root URI (/api.rest/device) but cannot be modified at this location. Each modifiable section has its own URI to retrieve and update that individual section.

An example of the device configuration XML may be:

```
<?xml version="1.0" encoding="utf-8"?>
<DeviceConfiguration
        xmlns:xsi="http://www.w3.org/2001/XMLSchema-instance"
        xmlns:xsd="http://www.w3.org/2001/XMLSchema"
        xmlns:xlink="http://www.w3.org/1999/xlink"
        xmlns="http://www.objectvideo.com/schemas/ovready">
   <DeviceInformation>
      <ID>SDC-002-3050-234</ID>
      <Manufacturer>Acme, Inc.</Manufacturer>
      <ModelName>SuperDuper Camera</ModelName>
      <ModelNumber>SDC-101</ModelNumber>
      <FirmwareVersion>3.2.1.2</FirmwareVersion>
      <HardwareVersion>Revision A</HardwareVersion>
      <AnalyticsVersion>5.0.1.6</AnalyticsVersion>
   </DeviceInformation>
   <SupportedFeatures>
      <SupportsNetworkConfiguration>true</
        SupportsNetworkConfiguration>
      <SupportsDHCP>false</SupportsDHCP>
      <SupportsFirmwareUpdate>true</SupportsFirmwareUpdate>
      <SupportsAnalyticsLicenseUpgrade>true
                       </SupportsAnalyticsLicenseUpgrade>
      <SupportsDeviceReset>true</SupportsDeviceReset>
      <SupportsChannelReset>true</SupportsChannelReset>
      <SupportsAlertPolling>true</SupportsAlertPolling>
      <SupportedAlertPollingBufferSize>5
                       </SupportedAlertPollingBufferSize>
      <SupportsAlertStreaming>true</SupportsAlertStreaming>
      <SupportsCountTallyPolling>true</SupportsCountTallyPolling>
      <SupportsCountStreaming>true</SupportsCountStreaming>
      <SupportsTargetPolling>true</SupportsTargetPolling>
      <SupportsTargetStreaming>true</SupportsTargetStreaming>
      <SupportsMetadataStreaming>true</SupportsMetadataStreaming>
      <SupportsSnapshots>true</SupportsSnapshots>
      <SupportedAnalyticsFrameSizes>
         <Size>
            <Width>320</Width>
            <Height>240</Height>
         </Size>
         <Size>
            <Width>352</Width>
            <Height>240</Height>
         </Size>
         <Size>
            <Width>352</Width>
            <Height>288</Height>
         </Size>
      </SupportedAnalyticsFrameSizes>
      <SupportedsnapshotImageContentType>image/jpeg
                       </SupportedSnapshotImageContentType>
      <SupportedPasswordChangeSchemes>
```

-continued

```
      <PasswordScheme>Basic</PasswordScheme>
      <PasswordScheme>Encrypted</PasswordScheme>
    </SupportedPasswordChangeSchemes>
    <SupportedContentTransferEncodings>
      <ContentTransferEncoding>x-identity</ContentTransferEncoding>
      <ContentTransferEncoding>x-deflate</ContentTransferEncoding>
      <ContentTransferEncoding>x-xml-
        token</ContentTransferEncoding>
      <ContentTransferEncoding>x-xml-token-deflate
                 </ContentTransferEncoding>
    </SupportedContentTransferEncodings>
    <SupportedDateTimeConfigurations>
      <Types>ManualDateTimeConfiguration</Types>
      <Types>NTPDateTimeConfiguration</Types>
    </SupportedDateTimeConfigurations>
  </SupportedFeatures>
  <DeviceLimits>
    <MaxIDPropertyLength>16</MaxIDPropertyLength>
    <MaxNamePropertyLength>127</MaxNamePropertyLength>
    <MaxUserAccounts>10</MaxUserAccounts>
    <UserLoginNameMinLength>6</UserLoginNameMinLength>
    <UserLoginNameMaxLength>63</UserLoginNameMaxLength>
    <UserPasswordMinLength>4</UserPasswordMinLength>
    <UserPasswordMaxLength>63</UserPasswordMaxLength>
  </DeviceLimits>
  </NetworkConfiguration xlink:type="simple"
      xlink:href="/api.rest/device/networkconfiguration">
    <HostName>mydevice</HostName>
    <IPAddress>192.168.1.2</IPAddress>
    <SubnetMask>255.255.255.0</SubnetMask>
    <DefaultGateway>192.168.1.1</DefaultGateway>
    <DNSAddresses>
      <Address>192.168.1.1</Address>
    </DNSAddresses>
    <DHCPEnabled>false</DHCPEnabled>
  </NetworkConfiguration>
  <DateTimeConfiguration
      xsi:type="NTPDateTimeConfiguration"
      xlink:type="simple"
      xlink:href="/api.rest/device/datetimeconfiguration">
    <NTPServerAddresses>
      <Address>192.168.1.4</Address>
      <Address>192.168.1.8</Address>
    </NTPServerAddresses>
    <DateTimeFormat>Default</DateTimeFormat>
  </DateTimeConfiguration>
</DeviceConfiguration>
```

The individual sections may be described below.

2.1. Device Information

The DeviceInformation describes the device itself. This section may be read-only. The ID field may be the unique identifier of the device itself. The Manufacturer, ModelName, and ModelNumber properties provide basic information on the device. If either ModelName or ModelNumber does not apply, it can be left blank.

The FirmwareVersion and HardwareVersion properties provide the version or revision numbers of the firmware and hardware, respectively.

The AnalyticsVersion property tells an application which version of the analytics library may be being used.

2.2. Supported Features

The SupportedFeatures section describes the features supported by this device. This section may be read-only.

The SupportsNetworkConfiguration property tells an application whether the device supports network configuration such as changing TCP/IP settings. If this value may be false, the device does not support this functionality and any changes to the NetworkConfiguration settings may be ignored.

The SupportsDHCP property tells an application whether the device supports DHCP. If this value may be true, the DHCPEnabled property of the NetworkConfiguration can be modified to turn DHCP on or off. If this value may be false, any changes to the DHCPEnabled property may be ignored.

The SupportsFirmwareUpdate property tells an application whether the firmware can be updated. This property provides an application with the knowledge of which devices can (or cannot) be updated.

The SupportsAnalyticsLicenseUpgrade property tells an application whether or not the analytics license can be upgraded to new functionality.

The SupportsDeviceReset and SupportsChannelReset properties tell the application whether the device can be reset as a whole or on a per-channel basis, respectively. If supported, the appropriate Reset operation can be performed on the device or a specific channel as detailed later.

The SupportsAlertPolling and SupportsAlertStreaming properties determine how the device may output alerts that may be triggered. For those outputs that may be supported, the appropriate settings should exist in the AlertConfiguration section for each channel. If either of these properties may be false, any attempts to access the corresponding alert output mechanism either at the device or channel level may return a HTTP status 403.

The SupportedAlertPollingBufferSize may be the maximum number alerts that can be buffered on the whole device for AlertPolling.

The SupportsCountTallyPolling and SupportsCountStreaming properties may be similar to the alert settings except they may be specific to count output. If either of these properties may be false, any attempts to access the corresponding count output mechanism at the device or channel level may return a 403.

The SupportsTargetPolling and SupportsTargetStreaming properties tell an application whether the device supports the output of target tracking data from the ObjectVideo OnBoard library. Target output may be requested on a channel basis. If either of these properties may be false, any attempts to access the corresponding target output mechanism on any channel may return a 403.

The SupportsMetadataStreaming property tells an application whether the device supports the output of metadata. Metadata output may be requested on a channel basis. If this property may be false, the device does not support this feature on any channel. If true, the device supports streaming of metadata (provided that the requested channel supports it). To determine if the channel can support metadata streaming, an application should check the AnalyticsCapabilities. Any attempts to access metadata streaming API on any channel that does not support it may return a HTTP status 403.

The SupportsSnapshots property tells an application whether the device supports channel or view snapshots. If this property may be false, a 403 may be returned when requesting a channel or view snapshot.

The SupportedAnalyticsFrameSizes property describes all supported resolutions for analytics. This may contain one or more supported resolutions.

The SupportedSnapshotImageFormat property describes the format of all images that may be included in alerts or returned by the view and channel snapshots. The view and channel snapshots repeat this content type in the HTTP header. This type follows the standard HTTP content types (e.g. image/jpeg, image/x-png, image/gif).

The SupportedPasswordChangeSchemes lists the supported password scheme

The SupportedContentTransferEncodings lists the supported MIME encodings

The SupportedDateTimeConfigurations lists the supported date time configurations that this device supports. If the device does not support any time changing mechanisms this list may be empty. The two options may be ManualDateTime-Configuration and NTPDateTimeConfiguration for manual editing the current time on the device and using an NTP server, respectively. These may be used as the "xsi:type" on the DateTimeConfiguration or as the actual type in the XML.

2.3. Device Limits

The DeviceLimits section describes the limits of various non-analytics features of the device. The analytics features may be listed under the AnalyticsCapabilities section. The DeviceLimit section may be read-only.

The MaxIDPropertyLength may be the maximum number of bytes that can be in the various ID properties of different types such as Channels, Rules and Views.

The MaxNamePropertyLength may be the maximum number of characters that can be in the various Name properties of different types such as Rules and Views.

The MaxUserAccounts property tells an application how many user accounts the device supports. The minimum value may be 1. Attempts to add a user beyond this range may fail and return an HTTP status code of 400.

The UserLoginNameMinLength and UserLoginNameMaxLength properties tell an application how long a valid user login ID may be. Attempts to add or edit a user with a login name outside this range may fail and return an HTTP status code of 400.

The UserPasswordMinLength and UserPasswordMaxLength properties tell an application how long a valid user password may be. Attempts to add or edit a user with a password outside this range may fail and return an HTTP status code of 400. If the application provides a value longer than the valid limit, the value may be truncated, if possible. If not possible, the device may return an HTTP status code of 400 anytime a value cannot be processed.

2.4. Network Configuration

The NetworkConfiguration section can be modified through the /api.rest/device/networkconfiguration URI. In addition, the NetworkConfiguration section can be individually retrieved from this same URI. The XML in both cases may be:

```
<?xml version="1.0" encoding="utf-8"?>
<NetworkConfiguration
        xmlns:xsi="http://www.w3.org/2001/XMLSchema-
        instance"
        xmlns:xsd="http://www.w3.org/2001/XMLSchema"
        xmlns="http://www.objectvideo.com/schemas/ovready">
    <HostName>mydevice</HostName>
    <IPAddress>192.168.1.2</IPAddress>
    <SubnetMask>255.255.255.0</SubnetMask>
    <DefaultGateway>192.168.1.1</DefaultGateway>
    <DNSAddresses>
        <Address>192.168.1.1</Address>
    </DNSAddresses>
    <DHCPEnabled>false</DHCPEnabled>
</NetworkConfiguration>
```

The IPAddress, HostName, SubnetMask, DefaultGateway, DNSAddresses, and DHCPEnabled properties may be the common properties for TCP/IP configuration. When the DeviceConfiguration may be retrieved, these values reflect the current state of the device. The HostName and DNSAddresses properties may be optional and may be left blank or omitted.

The DNSAddresses property lists up to two DNS server addresses. The first address may be always the primary DNS server address. The second, if it exists, may be the failover DNS server.

If the device supports network configuration (as reflected in the SupportsNetworkConfiguration property) then an application can change these settings. Otherwise, any attempt to change these settings may result in an HTTP status code of 403. If DHCP may be enabled, the other properties reflect the current settings from the DHCP server.

2.5. Date Time Configuration

The DateTimeConfiguration section can be modified through the /api.rest/device/datetimeconfiguration URI. In addition, the DateTimeConfiguration section can be individually retrieved from this same URI. The XML in both cases may be either of the following examples depending on whether the date time may be configured manually or through an NTP server. The ManualDateTimeConfiguration would look like:

```
<?xml version="1.0" encoding="utf-8"?>
<DateTimeConfiguration
        xmlns:xsi="http://www.w3.org/2001/XMLSchema-
        instance"
        xmlns:xsd="http://www.w3.org/2001/XMLSchema"
        xsi:type="ManualDateTimeConfiguration"
        xmlns="http://www.objectvideo.com/schemas/ovready">
    <DateTime>2007-03-12T12:29:02</DateTime>
    <DateTimeFormat>Default</DateTimeFormat>
</DateTimeConfiguration>
```

The DateTime property may be the current date and time on a GET. To update the time on the device, the application may put the ManualDateTimeConfiguration with the current date and time.

The DateTimeFormat field specifies the format of the date and time values that come from the device.

The NTPServerAddresses property specifies up to three Network Time Protocol (NTP) server addresses that can optionally be used to synchronize the time on the device. This can be a hostname or an IP address. If left blank, no synchronization may be done. If supported, the device can either implement an NTP client or a Simple Network Time Protocol (SNTP) client. The only difference between these two protocols may be that SNTP uses a less complex algorithm and may be more suited to an embedded device. The network and time formats may be identical.

The DateTimeFormat field specifies the format of the date and time values that come from the device.

2.6. Device Status

In addition, the device status can be checked through the /api.rest/devicestatus URI, which returns a response indicating whether the device may be running properly or not. The XML of the DeviceStatus may be:

```
<?xml version="1.0" encoding="utf-8"?>
<DeviceStatus  xmlns:xsi="http://www.w3.org/2001/XMLSchema-
        instance"
        xmlns:xsd="http://www.w3.org/2001/XMLSchema"
        xmlns="http://www.objectvideo.com/schemas/ovready">
    <Status>OK</Status>
    <StatusMessage>Running OK</StatusMessage>
    <CurrentTimestamp>2008-03-01T12:29:02.222</CurrentTimestamp>
    <LastBootTimestamp>2008-02-
    12T09:29:02.123</LastBootTimestamp>
</DeviceStatus>
```

The Status property lists the current state of the device. There may be three different status types: OK, Warning, and Error. The OK status means the device may be running properly. The Warning status means the device may be running but may have some issues (e.g., the device cannot contact the NTP server). The Error status means that the device may be not operating correctly.

The StatusMessage property provides more information on the current Status. For example, for a Warning status this property could be "Cannot contact NTP server 192.168.1.1". The value of this property may be dependant on the device.

The CurrentTimestamp property provides the application with the time on the device at the time of the request.

The LastBootTimestamp property provides the application with the last time the device was booted.

Note that either the CurrentTimestamp or LastBootTimestamp may not reflect the accurate time if the device cannot keep an accurate time or the time synchronization service may be unavailable.

2.7. Device Operations

The triggering certain operations on a device may be supported. To reset the device manually, an application does a PUT on the /api.rest/device/operation URI with a DeviceOperation. A DeviceOperation looks like this:

```
<?xml version="1.0" encoding="utf-8"?>
<DeviceOperation xmlns:xsi="http://www.w3.org/2001/XMLSchema-
                 instance"
                 xmlns:xsd="http://www.w3.org/2001/XMLSchema"
                 xmlns="http://www.objectvideo.com/schemas/
                 ovready">
  <Operation>Reset</Operation>
</DeviceOperation>
```

The Rese, operation causes the device to reset immediately. If the value may be anything else, an HTTP status code of 400 may be returned. A successful call returns a 204. However, if the device does not support Reset as defined in the DeviceConfiguration, this call may be ignored but may still return an HTTP code of 403.

3. Channel Configuration

The channel configuration APIs need to provide a mechanism to get the list of all channels as well as information about specific channels. An example of the channel list XML may be:

```
<?xml version="1.0" encoding="utf-8"?>
<ChannelList  xmlns:xsi="http://www.w3.org/2001/XMLSchema-
              instance"
              xmlns:xsd="http://www.w3.org/2001/XMLSchema"
              xmlns:xlink="http://www.w3.org/1999/xlink"
              xmlns="http://www.objectvideo.com/schemas/ovready">
  <ChannelSummary   xlink:type="simple"
                    xlink:href="/api.rest/channels/0">
    <ID>0</ID>
    <Name>Parking Lot PTZ</Name>
    <AnalyticsType>OnBoard 1000</AnalyticsType>
    <IsAnalyticsEnabled>false</IsAnalyticsEnabled>
  </ChannelSummary>
  <ChannelSummary   xlink:type="simple"
                    xlink:href="/api.rest/channels/1">
    <ID>1</ID>
    <Name>Main Entrance</Name>
    <AnalyticsType>OnBoard 200</AnalyticsType>
    <IsAnalyticsEnabled>false</IsAnalyticsEnabled>
  </ChannelSummary>
</ChannelList>
```

The ChannelList returns minimal information about each channel to provide some context. However, it provides an XLINK attribute with a URI to follow to obtain more information about the channel.

The ID property may be the identifier of this channel. This ID may be used to identify the channel in the ViewInfo on alerts and counts. It may be also contained within the data provided by the metadata stream. If the channel identifier may be not globally unique (or unique within a deployment), the application may need to store additional information to uniquely identify the channel. The example channel identifiers presented in this document may be simple string values and do not represent a globally unique identifier.

The Name property may be an optional field that provides a user-friendly name of the channel if one may be needed in an application. For example, an application could name the channel to reflect what it may be analyzing.

The AnalyticsType property may be the type of analytics that this channel may be licensed for. This may contain either the name of the license key or a value of None. None indicates that no key may be present and this channel may be not licensed and therefore may not run.

The IsAnalyticsEnabled property specifies whether this channel may be enabled for analytics or not. If the channel may be not licensed, this value may be always false.

3.1. Channel Information

The Channel type adds to the properties defined by ChannelSummary. The XML for each channel may be:

```
<?xml version="1.0" encoding="utf-8"?>
<Channel   xmlns:xsi="http://www.w3.org/2001/XMLSchema-instance"
           xmlns:xsd="http://www.w3.org/2001/XMLSchema"
           xmlns="http://www.objectvideo.com/schemas/ovready">
  <ID>0</ID>
  <AnalyticsType>OnBoard 1000</AnalyticsType>
  <Name>Parking Lot PTZ</Name>
  <VideoSource>video://0</VideoSource>
  <IsAnalyticsEnabled>true</IsAnalyticsEnabled>
  <IsAnalyticsCalibrationRequired>false
                        </IsAnalyticsCalibrationRequired>
  <IsAnalyticsCalibrated>false</IsAnalyticsCalibrated>
  <AnalyticsFrameSize>
    <Width>320</Width>
    <Height>240</Height>
  </AnalyticsFrameSize>
  <AlertConfiguration>
    <AlertPolling>
      <SnapshotOutput>true</SnapshotOutput>
      <DaySnapshotOutput>false</DaySnapshotOutput>
      <TargetOutput>true</TargetOutput>
      <SnapshotsInline>false</SnapshotsInline>
    </AlertPolling>
    <AlertStreaming>
      <SnapshotOutput>true</SnapshotOutput>
      <DaySnapshotOutput>false</DaySnapshotOutput>
      <TargetOutput>true</TargetOutput>
      <SnapshotsInline>true</SnapshotsInline>
    </AlertStreaming>
  </AlertConfiguration>
</Channel>
```

The ID and AnalyticsType may be read-only and any attempts to change these values may be ignored. The ID may be determined by the device while the AnalyticsType may be defined by the license key.

The Name property may be the name of this channel that an application would display to the user.

The VideoSource property may be an optional property that allows the application to configure what video source this channel may be analyzing. For example, this could be a specific analog video input on the device, a sub-window of the video frame, or a reference to an IP video stream. Refer to the device documentation to determine if this field may be required and, if so, what the acceptable values may be.

The IsAnalyticsEnabled property specifies whether this channel may be enabled for analytics or not. If this channel may be licensed, the analytics can be enabled or disabled as necessary. If the channel may be not licensed, this value may be always false and any attempts to update this property may be ignored.

The IsAnalyticsCalibrationRequired property may be read-only and specifies whether the analytics requires calibration. This depends on the license type and current setting. If this may be true, this channel should be calibrated before rules may be created for it. This property does not indicate whether the channel has been calibrated or not. It only specifies that the channel may need calibration.

The IsAnalyticsCalibrated property may be read-only and specifies whether the analytics has been calibrated or not. If the IsAnalyticsCalibrationRequired property may be false, this property should always return false.

The AnalyticsFrameSize property lists the resolution currently being processed by the library. Changing this property may cause the analytics to restart to process the different resolution. If the given resolution may be not supported, a 400 may be returned and the old value may be retained. The supported resolutions may be listed in the DeviceConfiguration.

The AlertConfiguration section describes how the alerts may be output from this channel. The SnapshotOutput, DaySnapshotOutput, and TargetOutput properties specify whether snapshots, day images (if the feature may be available), or target information (basic information about the target such as a bounding box) may be contained within the generated XML.

The DaySnapshotOutput works in conjunction with the Night Enhanced Snapshots feature of ObjectVideo OnBoard. This feature allows the channel to detect whether it may be day or night, and if night a daytime image from the same view can be sent to the application so that it can provide a better visual reference to when the alert occurred. If the device does not support this feature or this feature may be off, this setting may be ignored and no snapshot may be generated.

If SnapshotOutput may be false, DaySnapshotOutput, and SnapshotInline properties may be ignored and no markup may be output or snapshots be placed inside the XML.

If the SnapshotsInline property may be true, a Base64-encoded snapshot may be placed in the XML directly instead of a URI pointing to the snapshot. As mentioned previously any URIs defined in this document containing [channel root] equates to /api.rest/channels/[channel id].

3.2. Licensing Channels

Each channel on a device may be licensed individually. The type of license may be retrieved through the Channel APIs. However to change the license type the API in this section should be used. An example of the licensing XML may be:

```
<?xml version="1.0" encoding="utf-8"?>
<AnalyticsLicense   xmlns:xsi="http://www.w3.org/2001/XMLSchema-
                      instance"
                    xmlns:xsd="http://www.w3.org/2001/XMLSchema"
                    xmlns="http://www.objectvideo.com/schemas/
                      ovready">
    <License>Base64 Encoded License</License>
</AnalyticsLicense>
```

This License may be a Base64 encoded string of the actual license key that may be specific to that device. By changing this value, the software can be upgraded for additional features. If the channel may be given a license that cannot be supported or may be not valid, the update fails and returns an HTTP status code of 400 and the device stays in its previous state. Changing this property may cause the analytics to restart to reconfigure the channel with new license. Note that this API may be only to update the license. The license key cannot be retrieved. Only the type of license can be retrieved from the channel itself.

3.3. Analytics Capabilities

Since each channel on the device can be separately licensed, each channel can have a different set of analytics capabilities. An application can query for these capabilities and adjust itself accordingly. The capabilities listed in this section may be read-only. An example of the XML for the ObjectVideo OnBoard capabilities may be:

```
<?xml version="1.0" encoding="utf-8"?>
<AnalyticsCapabilities
          xmlns:xsi="http://www.w3.org/2001/XMLSchema-
            instance"
          xmlns:xsd="http://www.w3.org/2001/XMLSchema"
          xmlns="http://www.objectvideo.com/schemas/ovready">
  <AnalyticsType>OnBoard_1000MD</AnalyticsType>
  <MaxRulesPerView>5</MaxRulesPerView>
  <MaxViews>3</MaxViews>
  <SupportsAlertOutput>true</SupportsAlertOutput>
  <SupportsCountOutput>false</SupportsCountOutput>
  <SupportsMetadataOutput>true</SupportsMetadataOutput>
  <SupportsPeopleOnlyTracking>false</SupportsPeopleOnlyTracking>
  <IsPeopleOnlyTrackingEnabled>false</IsPeopleOnlyTrackingEnabled>
  <RequiresCalibration>false</RequiresCalibration>
  <SupportedEvents>
    <SupportedEvent>
      <XsiType>CameraTamperEventDefinition</XsiType>
      <Options xsi:type="CameraTamperOptions" />
    </SupportedEvent>
    <SupportedEvent>
      <XsiType>TripwireEventDefinition</XsiType>
      <Options xsi:type="TripwireOptions">
        <MaxPoints>28</MaxPoints>
        <SupportedClassifications>
          <Classification>Anything</Classification>
          <Classification>Human</Classification>
          <Classification>Vehicle</Classification>
        </SupportedClassifications>
      </Options>
    </SupportedEvent>
    <SupportedEvent>
      <XsiType>MultiLineTripwireEventDefinition</XsiType>
      <Options xsi:type="MultiLineTripwireOptions">
        <MaxPoints>28</MaxPoints>
        <SupportedClassifications>
          <Classification>Anything</Classification>
          <Classification>Human</Classification>
          <Classification>Vehicle</Classification>
        </SupportedClassifications>
        <MaxLines>2</MaxLines>
      </Options>
    </SupportedEvent>
    <SupportedEvent>
      <XsiType>FullFrameEventDefinition</XsiType>
      <Options xsi:type="FullFrameOptions">
        <SupportedClassifications>
          <Classification>Anything</Classification>
          <Classification>Human</Classification>
          <Classification>Vehicle</Classification>
        </SupportedClassifications>
        <SupportedActions>
          <Action>Appears</Action>
          <Action>Disappears</Action>
          <Action>LeftBehind</Action>
          <Action>TakenAway</Action>
        </SupportedActions>
      </Options>
    </SupportedEvent>
    <SupportedEvent>
      <XsiType>AreaOfInterestEventDefinition</XsiType>
      <Options xsi:type="AreaOfInterestOptions">
        <MaxPoints>28</MaxPoints>
        <SupportsGroundPlane>true</SupportsGroundPlane>
        <SupportsImagePlane>true</SupportsImagePlane>
        <SupportedClassifications>
          <Classification>Anything</Classification>
```

```xml
        <Classification>Human</Classification>
        <Classification>Vehicle</Classification>
      </SupportedClassifications>
      <SupportedActions>
        <Action>Enters</Action>
        <Action>Exits</Action>
        <Action>Inside</Action>
        <Action>Appears</Action>
        <Action>Disappears</Action>
        <Action>TakenAway</Action>
        <Action>LeftBehind</Action>
        <Action>Loiters</Action>
      </SupportedActions>
    </Options>
  </SupportedEvent>
</SupportedEvents>
<SupportedSchedules>
  <Type xsi:type="RecurringWeeklyScheduleOptions">
    <MaxTimeBlocks>24</MaxTimeBlocks>
  </Type>
</SupportedSchedules>
<SupportedFilters>
  <Type>MinimumSizeFilter</Type>
  <Type>MaximumSizeFilter</Type>
  <Type>SizeChangeFilter</Type>
  <Type>ShapeAndDirectionFilter</Type>
</SupportedFilters>
<SupportedResponses>
  <Type xsi:type="SimpleMessageResponseOptions">
    <MaxMessageLength>1024</MaxMessageLength>
    <MaxCustomResponseFields>8</MaxCustomResponseFields>
    <MaxCustomResponseKeyLength>32</MaxCustomResponseKeyLength>
    <MaxCustomResponseValueLength>128</MaxCustomResponseValueLength>
  </Type>
</SupportedResponses>
</AnalyticsCapabilities>
```

The AnalyticsCapabilities describe the full capabilities of the channel based on the license and current configuration of the device. If the license changes or certain parameters change, this could affect the capabilities. For example, the XML for ObjectVideo's counting package using the people-only tracker may be:

```xml
<?xml version="1.0" encoding="utf-8"?>
<AnalyticsCapabilities
        xmlns:xsi="http://www.w3.org/2001/XMLSchema-instance"
        xmlns:xsd="http://www.w3.org/2001/XMLSchema"
        xmlns="http://www.objectvideo.com/schemas/ovready">
  <AnalyticsType>ECS_Full</AnalyticsType>
  <MaxRulesPerView>5</MaxRulesPerView>
  <MaxViews>1</MaxViews>
  <SupportsAlertOutput>false</SupportsAlertOutput>
  <SupportsCountOutput>true</SupportsCountOutput>
  <SupportsMetadataOutput>false</SupportsMetadataOutput>
  <SupportsPeopleOnlyTracking>true</SupportsPeopleOnlyTracking>
  <IsPeopleOnlyTrackingEnabled>true</IsPeopleOnlyTrackingEnabled>
  <RequiresCalibration>true</RequiresCalibration>
  <SupportedEvents>
    <SupportedEvent>
      <XsiType>TripwireEventDefinition</XsiType>
      <Options xsi:type="TripwireOptions">
        <MaxPoints>28</MaxPoints>
        <SupportedClassifications>
          <Classification>Human</Classification>
        </SupportedClassifications>
      </Options>
    </SupportedEvent>
    <SupportedEvent>
      <XsiType>AreaOfInterestEventDefinition</XsiType>
      <Options xsi:type="AreaOfInterestOptions">
        <MaxPoints>28</MaxPoints>
        <SupportsGroundPlane>true</SupportsGroundPlane>
        <SupportsImagePlane>true</SupportsImagePlane>
        <SupportedClassifications>
          <Classification>Anything</Classification>
          <Classification>Human</Classification>
          <Classification>Vehicle</Classification>
        </SupportedClassifications>
        <SupportedActions>
          <Action>Enters</Action>
          <Action>Exits</Action>
          <Action>Loiters</Action>
        </SupportedActions>
      </Options>
    </SupportedEvent>
    <SupportedEvent>
      <XsiType>CountingAreaOfInterestEventDefinition</XsiType>
      <Options xsi:type="CountingAreaOfInterestOptions">
        <MaxPoints>28</MaxPoints>
        <SupportsGroundPlane>true</SupportsGroundPlane>
        <SupportsImagePlane>true</SupportsImagePlane>
        <SupportedClassifications>
          <Classification>Human</Classification>
        </SupportedClassifications>
        <SupportedActions>
          <Action>OccupancyData</Action>
          <Action>OccupancyThreshold</Action>
          <Action>DwellData</Action>
          <Action>DwellThreshold</Action>
        </SupportedActions>
      </Options>
    </SupportedEvent>
  </SupportedEvents>
  <SupportedSchedules>
    <Type xsi:type="RecurringWeeklyScheduleOptions">
      <MaxTimeBlocks>24</MaxTimeBlocks>
    </Type>
  </SupportedSchedules>
  <SupportedResponses>
    <Type xsi:type="SimpleMessageResponseOptions">
      <MaxMessageLength>1024</MaxMessageLength>
      <MaxCustomResponseFields>8</MaxCustomResponseFields>
      <MaxCustomResponseKeyLength>32</MaxCustomResponseKeyLength>
      <MaxCustomResponseValueLength>128</MaxCustomResponseValueLength>
    </Type>
  </SupportedResponses>
</AnalyticsCapabilities>
```

Note that the unsupported options do not show in the AnalyticsCapabilities XML. The capabilities for this same license type if people-only tracker may be disabled would change such that the classification types would not be restricted to Human and some of the SupportedActions might change. Regardless, the description of all possible properties may be listed below.

The AnalyticsType property may be the type of license currently enabled for this channel. This may be the same value as returned as part of the channel information. If the license type may be changed, the AnalyticsCapabilities may change so an application should check the current capabilities whenever the license may be changed.

The MaxRulesPerView property specifies how many rules can be supported per view on this channel. This number may be derived from the license (if applicable) as well as how the device configured the library.

The MaxViews property may be the maximum number of views this channel can support. This may be dependent on the license as well as how the device configured the ObjectVideo OnBoard library. There may always be at least one view, although certain license types may allow no more than one view.

The SupportsAlertOutput and SupportsCountOutput properties specify whether the channel supports output of alerts or counts. Typically, most channels may output either one type or the other. For example, counting licenses may only allow count output.

The SupportsForensicsMetadataOutput property specifies whether the channel allows output of Forensics metadata. If the license allows this, the device can either allow or disallow this functionality depending on the device specification.

The SupportsPeopleOnlyTracking property specifies whether the license allows using ObjectVideo's people-only tracking functionality. This feature improves the accuracy of counting results and enables Occupancy and Dwell rule types for Event Counting sensors. People-only tracking assumes that all objects of interest may be people. It works best in an indoor environment, with the camera placed overhead.

The IsPeopleOnlyTrackingEnabled property specifies whether people-only tracking may be currently enabled (if allowed). This setting may be changed through one of the parameters and may change what analytics capabilities may be available to this channel.

If IsPeopleOnlyTrackingEnabled may be enabled, the channel may require calibration. Turning this property on or off may change the AnalyticsCapabilities, so an application should check the current capabilities whenever this property may be changed.

The RequiresCalibration property specifies whether this channel needs to be calibrated to ensure successful detection.

The SupportedEvents section describes all the possible event types that can be included in a rule based on licensing and configuration. It contains one or more subelements of type SupportedEvent. A SupportedEvent contains an XsiType property and an Options property. The XsiType defines the type of EventDefinition that can be specified in the Rule. If a specific type may be not listed, it may be not supported. The Options property contains the options for this rule type, if any. The actual sub-type of Options may be listed as part of the xsi:type attribute.

The list of types and their supporting options may be:

Camera Tamper—This type of event detects when there may be significant change in the field of view of the camera such as when it may be moved or blocked. The XsiType may be CameraTamperEventDefinition. Its Options may be specified with xsi:type="CameraTamperOptions".

Tripwire—This type of event detects when an object crosses a Tripwire and may be specified by an XsiType of TripwireEventDefinition. Its Options may be specified with xsi:type="TripwireOptions".

The MaxPoints property specifies how many points may be allowed. A Tripwire should contain 2 points to create a single-segment Tripwire. However, if this value may be larger than 2, multi-segment Tripwires may be allowed.

The SupportedClassifications property lists all the classifications allowed with a Tripwire. See below for the list of classifications.

Multi-line Tripwire—This type of event detects when an object crosses more than one Tripwire within a certain timeframe and in a user-defined direction. It may be specified with the an XsiType of MultiLineTripwireEventDefinition and its Options may be specified with xsi:type="MultiLineTripwireOptions".

The MaxPoints property specifies the maximum number of points in each Tripwire.

The SupportedClassifications property specifies the list of objects that can be detected. There may be a single classification for all the Tripwires included in this event. See below for the list of classifications.

The MaxLines property specifies the maximum number of Tripwires that can comprise this event. Currently, this may be limited to 2, but this may expand in future versions.

Full Frame—This type of event detects when certain actions may be performed anywhere in the field of view. It may be specified with an XsiType of FullFrameEventDefinition and its Options may be specified with xsi:type="FullFrameOptions".

The SupportedClassifications property lists all the classifications allowed with a Full Frame rule. See below for the list of classifications.

The SupportedActions property list specifies all applicable actions that could be detected on the whole frame.

Area of Interest—This type of event detects when certain actions may be performed in a specified area of the frame. It may be specified with an XsiType of AreaofInterestEventDefinition and its Options may be specified with xsi:type="AreaOfInterestOptions".

The MaxPoints property specifies the maximum number of points that can make up an area. This value may be 3 or greater.

The SupportsGroundPlane and SupportsImagePlane properties specify how the ObjectVideo library may treat objects as they enter the area. Ground plane specifies that the part of the object that touches the ground, the "footprint," should be inside the area to trigger an event. This may allow a person to walk in front of an area without triggering an event. For image plane, an event may be triggered when any portion of the object overlaps with the area.

The SupportedClassifications property lists all the classifications allowed with an area of interest event. See below for the list of classifications.

The SupportedActions property list specifies all applicable actions that could be detected in the area.

Counting Area of Interest—This type of event detects when certain counting actions may be performed in a specified area of the frame. It may be specified with an XsiType of CountingAreaofInterestEventDefinition and its Options may be specified with xsi:type="CountingAreaofInterestOptions". The primary difference between this and an AreaOfInterestEventDefinition may be that the CountingAreaOfInterestEventDefinition can only have one counting action.

The MaxPoints property specifies the maximum number of points that can make up an area. This value may be 3 or greater.

The SupportsGroundPlane and SupportsImagePlane properties specify how objects may be treated as they enter the area. Ground plane specifies that the part of the object that touches the ground, the "footprint," should be inside the area to trigger an event. This may allow a person to walk in front of an area without triggering an event. For image plane, an event may be triggered when any portion of the object overlaps with the area.

The SupportedClassifications property lists all the classifications allowed with an area of interest event. See below for the list of classifications.

The SupportedActions property lists specifies all applicable counting actions that could be detected on the whole frame.

The SupportedSchedules property specifies the schedule types that can be configured for each rule. A rule may run only when the current time may be within the specified schedule period.

The SupportedFilters property specifies the list of allowable filters and may be determined by the license type. Filters help improve detection rates and reduce false triggering of events. The list of filters may be:

MinimumSizeFilter—When attached to a rule, this may filter out all objects that do not meet a minimum size.

MaximumSizeFilter—When attached to a rule, this may filter out all objects that may be greater than the specified size.

SizeChangeFilter—When attached to a rule, this may filter out all objects that drastically change size between two frames.

ShapeAndDirectionFilter—When attached to a rule, this may filter out all objects that do not appear with a consistent shape or direction. For example, the glare that appears on sunlit water may be ignored if this may be turned on.

The SupportedResponses property specifies the response types that can be configured for each rule. The response type may be a text string that may be output when the event may be triggered along with any specified custom response fields. However, applications can build upon these fields to provide other response types (such as e-mail or triggering a dry contact relay) within their own application. The MaxMessageLength may be the maximum number of characters that the device supports in the message. The MaxCustomResponseKeyLength and MaxCustomResponseValueLength may be the maximum number of characters, respectively, of each custom response field.

3.3.1. Classifications

The list of available classifications may be shown below.

Anything—For most event types, this includes all types of objects, including people, vehicles, and objects that cannot be classified as people or vehicles. For Left Behind and Taken Away events, these may be objects that do not appear to move on their own (e.g., a box that a person has left behind).

Human—Detect any person or person-shaped object.

Vehicle—Detect any vehicle or vehicle-shaped object.

3.3.2. Full Frame or Area of Interest Actions

The list of available actions may be shown below.

Enters—Detect when an object enters an area of interest from any direction. This may be not applicable to Full Frame rules as the object may be never seen crossing the area boundary—it just appears.

Exits—Detect when an object exits an area of interest in any direction. This may be not applicable to Full Frame rules as the object may be never seen crossing the area boundary—it just disappears.

Appears—Detect when an object becomes visible for the first time inside the full frame or area of interest.

Disappears—Detect when an object disappears from the camera view while in an area of interest or full frame.

Inside—Detect when an object may be inside an area or full frame. This may be similar to an Enters OR Appears action.

TakenAway—Detect when an object may be removed from the full frame or area of interest.

LeftBehind—Detect when an object may be left behind in the full frame or area of interest.

Loiters—Detect when an object remains continuously in an area or full frame for a user-specified period of time.

3.3.3. Counting Area of Interest Actions

The list of available counting actions may be shown below.

OccupancyData—Continuously output the current person occupancy count in an area.

OccupancyThreshold—Detect when a certain number of people may be in an area for at least a specified duration.

DwellData—Continuously output the amount of time people may be in a certain area. This may be output when the person exits or disappears from view.

DwellThreshold—Detect when a person has exceeded a specified amount of time inside an area. This detection occurs when the person exits or disappears from view. Any attempt to add rule types that may be not specified in the AnalyticsCapabilities may return a status code of 400 and the rule may not be added.

3.3.4. Analytics Calibration

If the IsAnalyticsCalibrationRequired property may be true, the library should be calibrated before use. Currently, the calibration may be required only for the people-only tracking functionality, although calibration may be required in the future under other circumstances. An example of the calibration XML may be:

```
<?xml version="1.0" encoding="utf-8"?>
<AnalyticsCalibration
        xmlns:xsi="http://www.w3.org/2001/XMLSchema-instance"
        xmlns:xsd="http://www.w3.org/2001/XMLSchema"
        xmlns="http://www.objectvideo.com/schemas/ovready">
  <Sample xsi:type="PersonCalibrationSample">
    <HeadPoint>
      <X>0.2</X>
      <Y>0.35</Y>
    </HeadPoint>
    <FootPoint>
      <X>0.2</X>
      <Y>0.55</Y>
    </FootPoint>
    <BoundingBox>
      <X>0.11</X>
      <Y>0.29</Y>
      <Width>0.2</Width>
      <Height>0.3</Height>
    </BoundingBox>
  </Sample>
  <Sample xsi:type="PersonCalibrationSample">
    <HeadPoint>
      <X>0.5</X>
      <Y>0.66</Y>
    </HeadPoint>
    <FootPoint>
      <X>0.5</X>
      <Y>0.85</Y>
    </FootPoint>
    <BoundingBox>
      <X>0.3</X>
      <Y>0.65</Y>
      <Width>0.2</Width>
      <Height>0.31</Height>
    </BoundingBox>
  </Sample>
  <Sample xsi:type="PersonCalibrationSample">
    <HeadPoint>
      <X>0.1</X>
      <Y>0.7</Y>
    </HeadPoint>
    <FootPoint>
      <X>0.3</X>
      <Y>0.92</Y>
    </FootPoint>
    <BoundingBox>
      <X>0.08</X>
      <Y>0.68</Y>
      <Width>0.2</Width>
      <Height>0.25</Height>
    </BoundingBox>
  </Sample>
</AnalyticsCalibration>
```

The AnalyticsCalibration type contains one or more calibration samples, for example, PersonCalibrationSample. Each PersonCalibrationSample contains HeadPoint, FootPoint, and BoundingBox properties that describe a person at a certain position in the frame. Each property may be normalized. The HeadPoint may be the set of coordinates at the top of an average sized person's head at that location in the frame. The FootPoint may be the set of coordinates at the bottom of an average sized person's feet at that location in the frame.

The BoundingBox includes the dimensions of an average sized person and needs to contain both the HeadPoint and FootPoint.

3.5. Analytics Configuration

For each channel, analytics can be configured and adapted to different environmental conditions and capabilities through the parameter model. The parameter model can be changed through a set of simplified parameters (called sliders) or through the full parameter model.

Some parameters or sliders may require a restart of the OnBoard library to take effect. Also, certain parameters may impact the current analytics capabilities.

3.5.1. Parameter Sliders

The parameter sliders provide a set of pre-configured settings that correspond to the most common ways in which parameters should be adjusted. These settings provide an easier way for an application to present the end-user with analytics tuning and facilitate customization of the library. Internally, each of these settings represents one or more parameters in the full parameter model.

An example of the parameter sliders XML may be:

```
<?xml version="1.0" encoding="utf-8"?>
<ParameterSliders xmlns:xsi="http://www.w3.org/2001/XMLSchema-instance"
         xmlns:xsd="http://www.w3.org/2001/XMLSchema"
         xmlns:xlink="http://www.w3.org/1999/xlink"
         xmlns="http://www.objectvideo.com/schemas/ovready">
<SliderSummary xlink:type="simple"
    xlink:href="[channel root]/analyticssliders/PeopleOnlyTracking">
    <Type>PeopleOnlyTracking</Type>
    <IsEnabled>false</IsEnabled>
    <RequiresRestart>true</RequiresRestart>
    <CurrentPosition>0</CurrentPosition>
    <DefaultPosition>0</DefaultPosition>
    <MaximumPosition>1</MaximumPosition>
</SliderSummary>
<SliderSummary xlink:type="simple"
    xlink:href="[channel root]/analyticssliders/CountingSensitivity">
    <Type>CountingSensitivity</Type>
    <IsEnabled>false</IsEnabled>
    <RequiresRestart>false</RequiresRestart>
    <CurrentPosition>2</CurrentPosition>
    <DefaultPosition>2</DefaultPosition>
    <MaximumPosition>4</MaximumPosition>
</SliderSummary>
<SliderSummary xlink:type="simple"
    xlink:href="[channel root]/analyticssliders/StationaryDuration">
    <Type>StationaryDuration</Type>
    <IsEnabled>false</IsEnabled>
    <RequiresRestart>false</RequiresRestart>
    <CurrentPosition>5</CurrentPosition>
    <DefaultPosition>5</DefaultPosition>
    <MaximumPosition>7</MaximumPosition>
</SliderSummary>
<SliderSummary xlink:type="simple"
    xlink:href="[channel root]/analyticssliders/ContrastSensitivity">
    <Type>ContrastSensitivity</Type>
    <IsEnabled>true</IsEnabled>
    <RequiresRestart>false</RequiresRestart>
    <CurrentPosition>2</CurrentPosition>
    <DefaultPosition>2</DefaultPosition>
    <MaximumPosition>4</MaximumPosition>
</SliderSummary>
<SliderSummary xlink:type="simple" xlink:href=
    "[channel root]/analyticssliders/MinimumObjectDetectionSize">
    <Type>MinimumObjectDetectionSize</Type>
    <IsEnabled>true</IsEnabled>
    <RequiresRestart>false</RequiresRestart>
    <CurrentPosition>2</CurrentPosition>
    <DefaultPosition>2</DefaultPosition>
    <MaximumPosition>4</MaximumPosition>
</SliderSummary>
<SliderSummary xlink:type="simple" xlink:href=
    "[channel root]/analyticssliders/StoppedObjectsMonitorDuration">
    <Type>StoppedObjectsMonitorDuration</Type>
    <IsEnabled>true</IsEnabled>
    <RequiresRestart>false</RequiresRestart>
    <CurrentPosition>2</CurrentPosition>
    <DefaultPosition>2</DefaultPosition>
    <MaximumPosition>4</MaximumPosition>
</SliderSummary>
<SliderSummary xlink:type="simple"
    xlink:href="[channel root]/analyticssliders/ViewSensitivity">
    <Type>ViewSensitivity</Type>
    <IsEnabled>true</IsEnabled>
    <RequiresRestart>false</RequiresRestart>
    <CurrentPosition>4</CurrentPosition>
    <DefaultPosition>4</DefaultPosition>
    <MaximumPosition>4</MaximumPosition>
</SliderSummary>
<SliderSummary xlink:type="simple"
    xlink:href="[channel root]/analyticssliders/BadSignalSensitivity">
    <Type>BadSignalSensitivity</Type>
    <IsEnabled>true</IsEnabled>
    <RequiresRestart>false</RequiresRestart>
    <CurrentPosition>4</CurrentPosition>
    <DefaultPosition>4</DefaultPosition>
    <MaximumPosition>4</MaximumPosition>
</SliderSummary>
<SliderSummary xlink:type="simple"
    xlink:href="[channel root]/analyticssliders/ViewsSupported">
    <Type>ViewsSupported</Type>
    <IsEnabled>true</IsEnabled>
    <RequiresRestart>false</RequiresRestart>
    <CurrentPosition>1</CurrentPosition>
    <DefaultPosition>1</DefaultPosition>
    <MaximumPosition>2</MaximumPosition>
</SliderSummary>
<SliderSummary xlink:type="simple"
    xlink:href="[channel root]/analyticssliders/ReportBadSignal">
    <Type>ReportBadSignal</Type>
    <IsEnabled>true</IsEnabled>
    <RequiresRestart>false</RequiresRestart>
    <CurrentPosition>1</CurrentPosition>
    <DefaultPosition>1</DefaultPosition>
    <MaximumPosition>1</MaximumPosition>
</SliderSummary>
<SliderSummary xlink:type="simple"
    xlink:href="[channel root]/analyticssliders/ImageStabilization">
    <Type>ImageStabilization</Type>
    <IsEnabled>true</IsEnabled>
    <RequiresRestart>true</RequiresRestart>
    <CurrentPosition>0</CurrentPosition>
    <DefaultPosition>0</DefaultPosition>
    <MaximumPosition>1</MaximumPosition>
</SliderSummary>
<SliderSummary xlink:type="simple"
    xlink:href="[channel root]/analyticssliders/NighttimeEnhancement">
    <Type>NighttimeEnhancement</Type>
    <IsEnabled>true</IsEnabled>
    <RequiresRestart>true</RequiresRestart>
    <CurrentPosition>0</CurrentPosition>
    <DefaultPosition>0</DefaultPosition>
    <MaximumPosition>1</MaximumPosition>
</SliderSummary>
</ParameterSliders>
```

This list may be read-only and can be retrieved through the [channel root]/analyticssliders URI.

The Type property may be the unique identifier for this slider.

The IsEnabled property describes whether this slider may be currently enabled or not. Some sliders may be only enabled under certain conditions related to slider/parameter settings or license type.

The RequiresRestart property describes whether changes to this slider require a restart or not.

Any changes to a slider that has a RequiresRestart value of true requires the device or channel to be restarted before the new values take effect. This restart may be not performed automatically and should be done manually.

The CurrentPosition property may be the current value of this slider. It ranges from −1 to MaximumPosition, inclusive.

The CurrentPosition usually ranges from 0 to MaximumPosition, inclusive, but if the parameters underlying the slider do not match with a slider position the CurrentPosition may be −1. This signifies that the slider may be in a customized position which may be typically caused by editing the underlying parameter directly through the full parameter model as described in the next section.

The DefaultPosition property may be the default value of the slider.

The MaximumPosition may be the largest value that the slider can have.

Some sliders may be Booleans sliders whose only values can be 0 (false) or 1 (true).

To modify a slider, an application can update the current value through the [channel root]/analyticssliders/[slider type] URI. Additionally, a slider's current value can be retrieved through this same URI with a GET. This XML looks like this:

```
<?xml version="1.0" encoding="utf-8"?>
<ParameterSlider xmlns:xsi="http://www.w3.org/2001/XMLSchema-instance"
    xmlns:xsd="http://www.w3.org/2001/XMLSchema"
    xmlns="http://www.objectvideo.com/schemas/ovready">
    <Type>ContrastSensitivity</Type>
    <CurrentPosition>2</CurrentPosition>
</ParameterSlider>
```

When updating, the Slider xlink attributes may be optional as the underlying reference may be based on the Type property. If the Type property may be unknown or invalid, an HTTP status code of 400 may be returned. If the update may be successful, an HTTP response code of either 200 or 204 may be returned (depending if the changed slider affected other sliders).

If the slider change affected other sliders, an HTTP status code of 200 may be returned along with a ParameterSlider list of the other sliders that were affected by the slider change.

For example, if the PeopleOnlyTracking slider was changed, the CountingSensitivity and StationaryDuration sliders become enabled. The example shown below may be the body that may be returned upon a successful update (and HTTP status code of 200).

```
<?xml version="1.0" encoding="utf-8"?>
<ParameterSliders
xmlns:xsi="http://www.w3.org/2001/XMLSchema-instance"
    xmlns:xsd="http://www.w3.org/2001/XMLSchema"
    xmlns:xlink="http://www.w3.org/1999/xlink"
    xmlns="http://www.objectvideo.com/schemas/ovready">
<SliderSummary xlink:type="simple"
    xlink:href="[channel
    root]/analyticssliders/CountingSensitivity">
    <Type>CountingSensitivity</Type>
    <IsEnabled>true</IsEnabled>
    <RequiresRestart>false</RequiresRestart>
    <CurrentPosition>2</CurrentPosition>
    <DefaultPosition>2</DefaultPosition>
    <MaximumPosition>4</MaximumPosition>
</SliderSummary>
<SliderSummary xlink:type="simple"
    xlink:href="[channel
    root]/analyticssliders/StationaryDuration">
    <Type>StationaryDuration</Type>
    <IsEnabled>true</IsEnabled>
    <RequiresRestart>false</RequiresRestart>
    <CurrentPosition>5</CurrentPosition>
    <DefaultPosition>5</DefaultPosition>
    <MaximumPosition>7</MaximumPosition>
</SliderSummary>
</ParameterSliders>
```

If the edited slider does not affect any other sliders, an HTTP status code of 204 may be returned with no content.

Note that changes to the PeopleOnlyTracking slider may require a restart of the library to take effect.

3.5.2. Full Parameter Model

The full parameter model provides access to all the parameters available to the ObjectVideo OnBoard library. Each parameter represents a key-value pair, when the key may be the parameter number and the value may be the parameter value. The full list of parameters can be retrieved through the [channel root]/analyticsparameters URI. An individual parameter can be retrieved or updated through the [channel root]/analyticsparameters/[num].

An example of the full parameter model XML may be:

```
<?xml version="1.0" encoding="utf-8"?>
<ParameterModel
xmlns:xsi="http://www.w3.org/2001/XMLSchema-instance"
    xmlns:xsd="http://www.w3.org/2001/XMLSchema"
    xmlns:xlink="http://www.w3.org/1999/xlink"
    xmlns="http://www.objectvideo.com/schemas/ovready">
<ParameterSummary xlink:type="simple"
    xlink:href="[channel root]/analyticsparameters/001">
    <ParameterNumber>001</ParameterNumber>
    <ParameterType>int32</ParameterType>
    <RequiresRestart>false</RequiresRestart>
    <Value>12</Value>
    <DefaultValue>12</DefaultValue>
</ParameterSummary>
<ParameterSummary xlink:type="simple"
    xlink:href="[channel root]/analyticsparameters/002">
    <ParameterNumber>002</ParameterNumber>
    <ParameterType>int32</ParameterType>
    <RequiresRestart>false</RequiresRestart>
    <Value>6</Value>
    <DefaultValue>6</DefaultValue>
</ParameterSummary>
...
<ParameterSummary xlink:type="simple"
    xlink:href="[channel root]/analyticsparameters/009">
    <ParameterNumber>009</ParameterNumber>
    <ParameterType>float32</ParameterType>
    <RequiresRestart>false</RequiresRestart>
    <Value>0.4</Value>
    <DefaultValue>0.4</DefaultValue>
</ParameterSummary>
...
<ParameterSummary xlink:type="simple"
    xlink:href="[channel root]/analyticsparameters/172">
    <ParameterNumber>172</ParameterNumber>
    <ParameterType>uint16</ParameterType>
    <RequiresRestart>true</RequiresRestart>
    <Value>25</Value>
    <DefaultValue>25</DefaultValue>
</ParameterSummary>
<ParameterSummary xlink:type="simple"
    xlink:href="[channel root]/analyticsparameters/173">
    <ParameterNumber>173</ParameterNumber>
    <ParameterType>uint8</ParameterType>
    <RequiresRestart>false</RequiresRestart>
    <Value>5</Value>
    <DefaultValue>5</DefaultValue>
</ParameterSummary>
...
<ParameterSummary xlink:type="simple"
    xlink:href="[channel root]/analyticsparameters/191">
    <ParameterNumber>191</ParameterNumber>
    <ParameterType>bool</ParameterType>
```

```
    <RequiresRestart>false</RequiresRestart>
    <Value>true</Value>
    <DefaultValue>true</DefaultValue>
</ParameterSummary>
<ParameterSummary xlink:type="simple"
        xlink:href="[channel root]/analyticsparameters/192">
    <ParameterNumber>192</ParameterNumber>
    <ParameterType>bool</ParameterType>
    <RequiresRestart>false</RequiresRestart>
    <Value>false</Value>
    <DefaultValue>false</DefaultValue>
</ParameterSummary>
</ParameterModel>
```

The ParameterNumber property may be the number of the parameter to be changed.

The ParameterType property may be the data type of this parameter's value. Currently, the valid types may be:

int32—a 32-bit signed integer value. The range of values may be from −2,147,483,648 to 2,147,483,647.

bool—a Boolean value. Valid values may be true or false.

float32—a single precision 32-bit floating point value.

uint8—an unsigned 8-bit integer. The range of values may be between 0 and 255.

uint16—an unsigned 16-bit integer. The range of values may be between 0 and 65535.

The RequiresRestart property describes whether changes to this parameter require a restart or not.

Any changes to a parameter that has a RequiresRestart value of true requires the device or channel to be restarted before the new parameter value take effect. This restart may be not performed automatically and should be done manually.

The Value property may be the current value of this parameter.

The DefaultValue property may be the default value for this parameter. This value could be different for the same parameter number based on the channel settings and license.

An individual parameter can be retrieved through the [channel root]/analyticsparameters/[num] URI. An example of an individual parameter XML may be:

```
<?xml version="1.0" encoding="utf-8"?>
<Parameter
xmlns:xsi="http://www.w3.org/2001/XMLSchema-instance"
        xmlns:xsd="http://www.w3.org/2001/XMLSchema"
        xmlns:"http://www.objectvideo.com/schemas/ovready">
<ParameterNumber>001</ParameterNumber>
<Value>16</Value>
</Parameter>
```

An individual parameter can also be updated through the [channel root]/analyticsparameters/[num] URI. On an update, if the value may be not valid, an HTTP status code of 400 may be returned. If the value may be valid, an HTTP response code of either 200 or 204 may be returned.

If the parameter in question changed other parameters, an HTTP status code of 200 may be returned along with any parameters that were affected by this change. For example, if parameter 154 affects parameters 145 and 167, the following XML shows the subset of the ParameterModel on a successful update that may be sent along with the HTTP status code of 200.

```
<?xml version="1.0" encoding="utf-8"?>
<ParameterModel
xmlns:xsi="http://www.w3.org/2001/XMLSchema-instance"
        xmlns:xsd="http://www.w3.org/2001/XMLSchema"
        xmlns:xlink="http://www.w3.org/1999/xlink"
        xmlns="http://www.objectvideo.com/schemas/ovready">
<ParameterSummary xlink:type="simple"
        xlink:href="[channel root]/analyticsparameters/145">
    <ParameterNumber>145</ParameterNumber>
    <ParameterType>int32</ParameterType>
    <RequiresRestart>false</RequiresRestart>
    <Value>65</Value>
    <DefaultValue>12</DefaultValue>
</ParameterSummary>
<ParameterSummary xlink:type="simple"
        xlink:href="[channel root]/analyticsparameters/167">
    <ParameterNumber>167</ParameterNumber>
    <ParameterType>int32</ParameterType>
    <RequiresRestart>false</RequiresRestart>
    <Value>13</Value>
    <DefaultValue>10</DefaultValue>
</ParameterSummary>
</ParameterModel>
```

Note that most parameters do not have any side effects that change other parameters. If no parameters were affected by the change an HTTP status code of 204 may be returned instead of 200.

3.5.3. Resetting Parameters

The channel parameter model can be reset back to factory defaults by calling the [channel root]/analyticsparameters/defaults URI. This may be a PUT method but takes no arguments. The library may need to be restarted after this may be completed. This may also reset the parameter sliders back to their defaults as they use the underlying parameter model.

Note that there may be no data sent to the device when resetting the parameters and there may be no data returned on a success, just a status code of 204.

3.6. Channel Snapshots

An application can request the current snapshot for a channel on the device. The response value may be a binary image (not XML). The HTTP header Content-Type may describe the type of image returned (JPEG, PNG, etc). For example, the following may be an example of the HTTP header returned on a request.

```
HTTP/1.1 200 OK
Content-Type: image/jpeg
Content-Length: 45029
...
<Binary data>
...
```

For those devices that do not support snapshot retrieval, the HTTP status code of 403 may be returned.

3.7. Channel Operations

Triggering certain operations on a channel may be supported, for example, resetting the channel manually. To do this, an application does a PUT on the [channel root]/operation URI with a ChannelOperation. A ChannelOperation looks like this:

```
<?xml version="1.0" encoding="utf-8"?>
<ChannelOperation
xmlns:xsi="http://www.w3.org/2001/XMLSchema-instance"
        xmlns:xsd="http://www.w3.org/2001/XMLSchema"
        xmlns="http://www.objectvideo.com/schemas/ovready">
<Operation>Reset</Operation>
</ChannelOperation>
```

4. View Management

PTZ cameras or video multiplexers may be supported. The library handles the types of cameras and multiplexers through the "views," where a view represents a single PTZ guard tour stop or an input on a video multiplexer. The library can be configured to recognize some or all of these as views if the user adds each one as a view.

Each channel in an device can have one or more named views which correspond to different positions of the camera (or input on a multiplexer). The channel should actively correspond to a view for the video analytics to operate and for rules to apply.

To get the list of views, an application queries the device. If the device may be configured for a single view, the query always returns one view. The view list XML looks like this:

```
<?xml version="1.0" encoding="utf-8"?>
<ViewList xmlns:xsi="http://www.w3.org/2001/XMLSchema-instance"
        xmlns:xsd="http://www.w3.org/2001/XMLSchema"
        xmlns:xlink="http://www.w3.org/1999/xlink"
        xmlns="http://www.objectvideo.com/schemas/ovready">
<ViewSummary xlink:type="simple"
        xlink:href="[channel root]/views/view001">
<ID>view001</ID>
<Name>Parking Lot</Name>
<IsCurrentView>true</IsCurrentView>
</ViewSummary>
<ViewSummary xlink:type="simple"
        xlink:href="[channel root]/views/view002">
<ID>view002</ID>
<Name>Back door</Name>
<IsCurrentView>false</IsCurrentView>
</ViewSummary>
</ViewList>
```

As in the ChannelList, the ViewList contains summary information about a view, but the full view XML can be retrieved by following the URI listed in the XLINK attribute. The ID and Name properties may be the view's ID and name.

The IsCurrentView flag lets an application know which of the views may be currently active (or known), if any. There may be a maximum of one true value in the list, although the list may have no currently known views. The current view can also be retrieved through the ViewStatus detailed below.

The following list shows the allowable view states along with a brief description.

Known View—the channel currently may be in a known, previously added, view. When this may be the view status, the video signal may be processed, rules may be active, and events may be detected.

UnknownView—the channel does not match the current video feed to any previously stored views. Until the view may be returned to a Known View, no rules may be active and the channel does not generate any new responses or useful forensics data.

BadSignal—the channel's video signal may be currently non-existent or of low quality or contrast. Until the view may be returned to a KnownView, the channel does not generate any new responses or useful forensics data.

SearchingForView—the channel may be currently searching through its list of stored views to find a match. This status may be usually transitory and after a short time should be replaced with either a Known View or Unknown View status.

4.1. Views

A view may be created at initialization so there may always be at least one view in the system. To add another view, the channel should currently be in the UnknownView state. To add a view, an application POSTs the view XML to the root URI for views on that channel ([channel root]/views). This creates and saves a view at the current camera position or input on a multiplexer with the specified name.

Note that this does not save the actual PTZ coordinates or the multiplexer input number. Reference data that can be used to recognize the same location algorithmically may be saved.

Retrieving, updating or deleting a view may be done through the individual view URI ([channel root]/views/[id]).

The view XML looks like this:

```
<?xml version="1.0" encoding="utf-8"?>
<View xmlns:xsi="http://www.w3.org/2001/XMLSchema-instance"
        xmlns:xsd="http://www.w3.org/2001/XMLSchema"
        xmlns:xlink="http://www.w3.org/1999/xlink"
        xmlns="http://www.objectvideo.com/schemas/ovready">
<ID>view001</ID>
<Name>Parking Lot</Name>
<IsCurrentView>true</IsCurrentView>
<Snapshot xlink:type="simple"
        xlink:href="[channel root]/views/view001/snapshot" />
</View>
```

The ID, Name, and IsCurrentView properties may be the same as the ones defined in the ViewSummary type.

The Snapshot property contains a link to the view snapshot, if available. If this property may be empty, the device does not have a saved snapshot for this view.

When adding a view, if the ID field may be empty then the device may create an identifier. When adding or updating a view, the Snapshot and IsCurrentView properties may be ignored and can be left blank. The ID cannot be changed once added. Any attempt to do so may return a 400 on the PUT.

When adding a view with an application generated ID, the device may return a status code of 400 if the ID already exists.

4.2. View Snapshots

An application can request the snapshot for any view on the device. The image returned may be from the last time that view snapshot was saved. The response value may be a binary image (not XML). The HTTP header Content-Type may describe the type of image returned (JPEG, PNG, etc.). For example, the following may be an example of the HTTP header returned on a request.

```
HTTP/1.1 200 OK
Content-Type: image/jpeg
Content-Length: 45029
...
<Binary data>
...
```

For those devices that do not support snapshot retrieval, the HTTP status code of 403 may be returned.

4.3. View Status

An application can get the current view status and determine what the current active view may be. This XML looks like this:

```
<?xml version="1.0" encoding="utf-8"?>
<ViewStatus xmlns:xsi="http://www.w3.org/2001/XMLSchema-instance"
        xmlns:xsd="http://www.w3.org/2001/XMLSchema"
        xmlns:xlink="http://www.w3.org/1999/xlink"
        xmlns="http://www.objectvideo.com/schemas/ovready">
<ViewState>KnownView</ViewState>
<ViewInfo xlink:type="simple"
        xlink:href="[channel root]/views/view001">
<ID>view001</ID>
<Name>Parking Lot</Name>
</ViewInfo>
</ViewStatus>
```

The ViewState property tells an application whether the channel may be in a known view or not. If the value may be KnownView, the ViewInfo provides the ID and Name of the view that may be current active. If the ViewState may be not KnownView, the ViewInfo may be empty or non-existent as shown below:

```
<?xml version="1.0" encoding="utf-8"?>
<ViewStatus xmlns:xsi="http://www.w3.org/2001/XMLSchema-instance"
        xmlns:xsd="http://www.w3.org/2001/XMLSchema"
        xmlns="http://www.objectvideo.com/schemas/ovready">
<ViewState>UnknownView</ViewState>
</ViewStatus>
```

4.4. Forcing Views

If the view may be not currently known but should match a previously stored view ID, the view can be forced to override a previously stored view. To do this, an application explicitly calls the [channel root]/views/[id]/current URI and a successful call results in an HTTP status code of 204. The channel should be in the Unknown View state in order to force the view. If the current state may be not Unknown View and the view may be forced, the force view fails, an HTTP status code of 400 may be returned, and the device stays in its current state.

Note that there may be no data sent to the device when forcing a view and there may be no data returned on a success, just a status code of 204.

5. Rule Management

A device can store a number of rules internally. To obtain a list of all rules for a channel, an application can make a query to http://server/[channel root]/rules and the XML returned may be:

```
<?xml version="1.0" encoding="utf-8"?>
<RuleList xmlns:xsi="http://www.w3.org/2001/XMLSchema-instance"
        xmlns:xsd="http://www.w3.org/2001/XMLSchema"
        xmlns:xlink="http://www.w3.org/1999/xlink"
xmlns="http://www.objectvideo.com/schemas/ovready">
<RuleSummary xlink:type="simple"
        xlink:href="[channel root]/rules/rule001">
    <ID>rule001</ID>
    <Name>Rule1</Name>
    <ViewInfo xlink:type="simple"
        xlink:href="[channel root]/views/view001">
    <ID>view001</ID>
    <Name>Parking Lot</Name>
    </ViewInfo>
    <IsActive>true</IsActive>
</RuleSummary>
<RuleSummary xlink:type="simple"
        xlink:href="[channel root]/rules/rule002">
    <ID>rule002</ID>
    <Name>Rule2</Name>
    <ViewInfo xlink:type="simple"
        xlink:href="[channel root]/views/view002">
    <ID>view002</ID>
    <Name>Somewhere Else</Name>
    </ViewInfo>
    <IsActive>true</IsActive>
</RuleSummary>
</RuleList>
```

As in the ChannelList, the RuleList contains summary information about a rule, but the full rule XML can be retrieved by following the URI listed in the XLINK attribute.

Obtaining the list of all rules on a channel may return all rules on the channel itself (e.g. non-view specific rules) as well as all rules on each view on that channel. The list of rules can also be filtered by requesting the rules under a specific view. For example, a query to http://server/[channel root]/views/view1/rules may return:

```
<?xml version="1.0" encoding="utf-8"?>
<RuleList xmlns:xsi="http://www.w3.org/2001/XMLSchema-instance"
        xmlns:xsd="http://www.w3.org/2001/XMLSchema"
        xmlns:xlink="http://www.w3.org/1999/xlink"
xmlns="http://www.objectvideo.com/schemas/ovready">
<RuleSummary xlink:type="simple"
        xlink:href="[channel root]/rules/rule001">
    <ID>rule001</ID>
    <Name>Rule1</Name>
    <ViewInfo xlink:type="simple"
        xlink:href="[channel root]/views/view001">
    <ID>view001</ID>
    <Name>Parking Lot</Name>
    </ViewInfo>
    <IsActive>true</IsActive>
</RuleSummary>
</RuleList>
```

Note that the rule URIs shown in the RuleList always reside under the channel root for both channel and view level rules.

Example XML for a rule may be:

```
<?xml version="1.0" encoding="utf-8"?>
<Rule xmlns:xsi="http://www.w3.org/2001/XMLSchema-instance"
        xmlns:xsd="http://www.w3.org/2001/XMLSchema"
        xmlns:xlink="http://www.w3.org/1999/xlink"
        xmlns="http://www.objectvideo.com/schemas/ovready">
    <ID>rule001</ID>
    <Name>Tripwire rule</Name>
    <IsActive>true</IsActive>
    <ViewInfo xlink:type="simple"
            xlink:href="[channel root]/views/view001">
    <ID>view001</ID>
    <Name>Parking Lot</Name>
    </ViewInfo>
    <EventDefinition xsi:type="TripwireEventDefinition">
    <Classifications>
            <Classification>Human</Classification>
    </Classifications>
    <TripwireDirection>AnyDirection</TripwireDirection>
    <Points>
            <Point>
            <X>0.2</X>
            <Y>0.6</Y>
            </Point>
            <Point>
            <X>0.2</X>
            <Y>0.8</Y>
            </Point>
            <Point>
            <X>0.4</X>
            <Y>0.8</Y>
            </Point>
    </Point>
    <Filters>
            <Filter xsi:type="MaximumSizeFilter">
            <NearRectangle>
                <X>0.2</X>
                <Y>0.3</Y>
                <Width>0.2</Width>
                <Height>0.2</Height>
            </NearRectangle>
            <FarRectangle>
                <X>0.5</X>
                <Y>0.6</Y>
                <Width>0.4</Width>
                <Height>0.3</Height>
            </FarRectangle>
            </Filter>
    </Filters>
    </EventDefinition>
    <ResponseDefinition xsi:type="SimpleMessageResponse">
    <Message>Tripwire crossed</Message>
```

```
        </ResponseDefinition>
        <Schedule xsi:type="RecurringWeeklySchedule">
        <WeeklyTimeBlocks>
             <WeeklyTimeBlock>
             <StartDayOfWeek>1</StartDayOfWeek>
             <EndDayOfWeek>1</EndDayOfWeek>
             <StartMinuteOfDay>540</StartMinuteOfDay>
             <EndMinuteOfDay>1020</EndMinuteOfDay>
             </WeeklyTimeBlock>
             <WeeklyTimeBlock>
             <StartDayOfWeek>2</StartDayOfWeek>
             <EndDayOfWeek>2</EndDayOfWeek>
             <StartMinuteOfDay>540</StartMinuteOfDay>
             <EndMinuteOfDay>1020</EndMinuteOfDay>
             </WeeklyTimeBlock>
        </WeeklyTimeBlocks>
        </Schedule>
        </Rule>
```

Rules may be typically view-specific, though channel-level rules may be supported. If a rule may be defined at the channel level, the ViewInfo may not exist or may be left empty. When adding or updating a rule, the ViewName may be optional. Any changes to the ViewName may be ignored.

Rules may be comprised of an event definition, optional response definition, optional schedule, and optional filters. The sections below provide details on each of these elements.

When adding a rule, the server responds with an HTTP status code of 201 along with the URI of the newly-created rule. For example, a POST to [channel root]/rules would return [channel root]/rules/rule009.

5.1. Event Definitions

A rule can have a single type of event defined but that event can have multiple options. The actual type of the event definition may be listed in the xsi:type attribute. The available types of events for each channel can be determined by the AnalyticsCapabilities for the channel.

For events that support the Classifications property, this property contains one or more classification types, as defined in the AnalyticsCapabilities for the appropriate event type. The Anything classification, if specified, supersedes all other classification types and therefore other types do not need to be specified.

Certain events can have zero or more filters. See the individual event section below for more information. If there may be no filters defined, the Filters element may not exist.

5.1.1. Tripwire

A Tripwire event may be defined by xsi:type="TripwireEventDefinition". A Tripwire can have zero or more filters. An example Tripwire with a single filter may be shown below:

```
<Rule>
...
<EventDefinition xsi:type="TripwireEventDefinition">
   <Classifications>
   <Classification>Human</Classification>
   </Classifications>
   <TripwireDirection>AnyDirection</TripwireDirection>
   <Points>
   <Point>
        <X>0.2</X>
        <Y>0.6</Y>
   </Point>
   <Point>
        <X>0.2</X>
        <Y>0.8</Y>
   </Point>
   <Point>
```

```
        <X>0.4</X>
        <Y>0.8</Y>
   </Point>
   </Points>
   <Filters>
   <Filter xsi:type="MaximumSizeFilter">
        <NearRectangle>
        <X>0.2</X>
        <Y>0.3</Y>
        <Width>0.2</Width>
        <Height>0.2</Height>
        </NearRectangle>
        <FarRectangle>
        <X>0.5</X>
        <Y>0.6</Y>
        <Width>0.4</Width>
        <Height>0.3</Height>
        </FarRectangle>
   </Filter>
   </Filters>
</EventDefinition>
...
</Rule>
```

The TripwireDirection property defines the direction that a Tripwire should be crossed in order to trigger the event. This can be LeftToRight, RightToLeft, or AnyDirection. The actual left or right direction depends on the order of the points. To determine the left and right directions, imagine a person standing on the first point looking at the second point. The left and right directions match the person's left and right sides. This process may be repeated for all following points defined in the Tripwire. The points may be all normalized.

The Points property contains a series of X and Y coordinates for the line. For a Tripwire that may be a straight line, there may be two defined points, each corresponding to one of the line's end points. For multi-segment Tripwires, there may be additional points defined for points of intersection between each segment. The maximum points may be defined in the AnalyticsCapabilities.

5.1.2. Multi-Line Tripwire

A Multi-line Tripwire event may be defined by xsi:type="MultiLineTripwireEventDefinition" and can have zero or more filters. An example Multi-line Tripwire with a single filter may be shown below:

```
<Rule>
...
<EventDefinition xsi:type="MultiLineTripwireEventDefinition">
   <Classifications>
        <Classification>Human</Classification>
   </Classifications>
   <LineCrossingOrder>Before</LineCrossingOrder>
   <Duration>0</Duration>
   <Tripwires>
        <Tripwire>
        <TripwireDirection>LeftToRight</TripwireDirection>
        <Points>
             <Point>
             <X>0.2</X>
             <Y>0.6</Y>
             </Point>
             <Point>
             <X>0.2</X>
             <Y>0.8</Y>
             </Point>
        </Points>
        </Tripwire>
        <Tripwire>
        <TripwireDirection>LeftToRight</TripwireDirection>
        <Points>
             <Point>
```

```
        <X>0.6</X>
        <Y>0.6</Y>
      </Point>
      <Point>
        <X>0.6</X>
        <Y>0.8</Y>
      </Point>
    </Points>
  </Tripwire>
</Tripwires>
<Filters>
  <Filter xsi:type="MaximumSizeFilter">
    <NearRectangle>
      <X>0.2</X>
      <Y>0.3</Y>
      <Width>0.2</Width>
      <Height>0.2</Height>
    </NearRectangle>
    <FarRectangle>
      <X>0.5</X>
      <Y>0.6</Y>
      <Width>0.4</Width>
      <Height>0.3</Height>
    </FarRectangle>
  </Filter>
</Filters>
</EventDefinition>
...
</Rule>
```

The Multi-line Tripwire may be comprised of more than one separate Tripwires. A Multi-line Tripwire event may be triggered when each Tripwire may be crossed within a configurable time frame. The number of Tripwires involved in a Multi-line Tripwire event may be specified in the AnalyticsCapabilities.

The LineCrossingOrder property refers to whether or not the two Tripwires should be crossed in any particular order. The options may be BeforeOrAfter or Before. BeforeOrAfter indicates that the order in which the Tripwires may be crossed does not matter. The value of Before indicates that the Tripwires should be crossed in a particular order, with the first Line mentioned in the Lines property being crossed before the second Line.

The Duration property specifies the time frame, in seconds, within which both Tripwires should be crossed to trigger an event.

The Tripwire property provides information about each Tripwire's position and object direction.

The TripwireDirection property defines the direction that a Tripwire should be crossed in order to trigger the event. This can be LeftToRight, RightToLeft, or AnyDirection. The actual left or right direction depends on the order of the points. To determine the left and right directions, imagine a person standing on the first point looking at the second point. The left and right directions match the person's left and right sides. This process may be repeated for all following points defined in the Tripwire. The points may be all normalized.

The Points property contains a series of X and Y coordinates for the line. For a Tripwire that may be a straight line, there may be two defined points, each corresponding to one of the line's end points. For multi-segment Tripwires, there may be additional points defined for points of intersection between each segment. The maximum number of points in a Tripwire may be defined in the AnalyticsCapabilities. The number of points in each Tripwire may be independent of any other Tripwire. For example, one Tripwire can have two points while another has three.

5.1.3. Area of Interest

An area of interest event may be defined by xsi:type="AreaOfInterestEventDefinition" and can have zero or more filters. The event should contain at least one Action, but may contain multiple Actions. An example area of interest event with one filter may be shown below:

```
<Rule>
...
<EventDefinition xsi:type="AreaOfInterestEventDefinition">
  <PlaneType>Ground</PlaneType>
  <Points>
    <Point>
      <X>0.2</X>
      <Y>0.6</Y>
    </Point>
    <Point>
      <X>0.2</X>
      <Y>0.8</Y>
    </Point>
    <Point>
      <X>0.6</X>
      <Y>0.6</Y>
    </Point>
    <Point>
      <X>0.6</X>
      <Y>0.8</Y>
    </Point>
  </Points>
  <Classifications>
    <Classification>Human</Classification>
  </Classification>
  <Actions>
    <Action xsi:type="EnterAreaAction" />
    <Action xsi:type="LoiterAreaAction">
      <Duration>3000</Duration>
    </Action>
  </Actions>
  <Filters>
    <Filter xsi:type="MaximumSizeFilter">
      <NearRectangle>
        <X>0.2</X>
        <Y>0.3</Y>
        <Width>0.2</Width>
        <Height>0.2</Height>
      </NearRectangle>
      <FarRectangle>
        <X>0.5</X>
        <Y>0.6</Y>
        <Width>0.4</Width>
        <Height>0.3</Height>
      </FarRectangle>
    </Filter>
  </Filters>
</EventDefinition>
...
</Rule>
```

The PlaneType property indicates whether the area of interest may be a ground plane (Ground) or an image plane (Image). Ground specifies that the bottom of the object (the "footprint") should be inside the area to trigger an event. This may allow a person to walk in front of an area without triggering an event. For Image, the event may be triggered when any portion of the object may be detected within the area of interest.

The Points property includes at least three points which define the corners of the area of interest. The number of points may be variable, but a maximum setting may be established in AnalyticsCapabilities. In the example above, the area of interest may be a rectangle, with X and Y coordinates provided for each one of its four corners.

5.1.3.1. Area Actions

This section lists the Actions currently available. Most actions may be simply differentiated by the xsi:type attribute. However, there may be some actions that have additional properties.

```
<Action xsi:type="EnterAreaAction" />
<Action xsi:type="ExitAreaAction" />
<Action xsi:type="InsideAreaAction" />
<Action xsi:type="AppearAreaAction" />
<Action xsi:type="DisappearAreaAction" />
<Action xsi:type="TakeAwayAreaAction" />
<Action xsi:type="LeaveBehindAreaAction">
    <Duration>15000</Duration>
</Action>
<Action xsi:type="LoiterAreaAction">
    <Duration>30000</Duration>
</Action>
```

The LeaveBehindAreaAction and LoiterAreaAction each have a Duration property that may be specified in milliseconds. For the LeaveBehindAreaAction and LoiterAreaAction types, the Duration may be how long to wait until an event may be triggered.

5.1.4. Counting Area of Interest

A counting area of interest may be an event that may be really specific to counting-based actions such as Occupancy and Dwell. A counting area of interest event may be defined by xsi:type="CountingAreaOfInterestEventDefinition". This event differs from a standard "AreaOfInterestDefinition" in that it only allows a single action, a single classification and filters may be not allowed. An example counting area of interest event may be shown below:

```
<Rule>
...
<EventDefinition xsi:type="CountingAreaOfInterestEventDefinition">
<PlaneType>Ground</PlaneType>
<Points>
    <Point>
        <X>0.2</X>
        <Y>0.6</Y>
    </Point>
    <Point>
        <X>0.2</X>
        <Y>0.8</Y>
    </Point>
    <Point>
        <X>0.6</X>
        <Y>0.6</Y>
    </Point>
    <Point>
        <X>0.6</X>
        <Y>0.8</Y>
    </Point>
</Points>
<Classification>Human</Classification>
<Action xsi:type="OccupancyDataAreaAction" />
</EventDefinition>
...
</Rule>
```

The PlaneType property indicates whether the area of interest may be a GroundPlane or an ImagePlane. GroundPlane specifies that the bottom of the object (the "footprint") should be inside the area to trigger an event. This may allow a person to walk in front of an area without triggering an event. For ImagePlane, the event may be triggered when any portion of the object may be detected within the area of interest.

The Points property includes at least three points which define the corners of the area of interest. The number of points may be variable, but a maximum setting may be established in AnalyticsCapabilities. In the example above, the area of interest may be a rectangle, with X and Y coordinates provided for each one of its four corners.

The Classification property contains a single classification type defined in the AnalyticsCapabilities.

Note that currently a CountingAreaOfInterestEventDefinition requires that IsPeopleOnlyTrackerEnabled be set to true. If this setting may be false, the rule may not be added and an HTTP status code of 400 may be returned.

5.1.4.1. Counting Area Actions

This section lists exemplary Actions. Some actions may be simply differentiated by the xsi:type attribute. However, there may be some actions that have additional properties.

```
<Action xsi:type="OccupancyDataAreaAction" />
<Action xsi:type="OccupancyThresholdAreaAction">
    <Comparator>GreaterThanOrEqual</Comparator>
    <Count>5</Count>
    <Duration>1000</Duration>
</Action>
<Action xsi:type="DwellDataAreaAction" />
<Action xsi:type="DwellThresholdAreaAction">
    <Duration>2000</Duration>
</Action>
```

The DwellThresholdAreaAction has a Duration property that may be specified in milliseconds which may be the minimum duration that an object should dwell in the area before an event may be triggered.

The OccupancyThresholdAreaAction requires three additional properties. The Comparator property specifies when to trigger an event in relation to the count. In the example above, the Occupancy Threshold rule may trigger once the area's occupancy count becomes greater than or equal to five. The valid values for the Comparator may be: Equal, GreaterThanOrEqual, and LessThanOrEqual.

The Duration property of an OccupancyThresholdAreaAction tells the rule to trigger only if the occupancy meets the criteria for the specified time in milliseconds. A value of zero may trigger the event immediately if the occupancy changes across the threshold. However, if this value may be greater than zero, the rule may wait for the specified time before triggering the event (if the conditions still apply). The main purpose for this property may be to avoid miscounts with people passing through the area for very short periods of time.

5.1.5. Full Frame

A Full Frame event may be defined by xsi:type="FullFrameEventDefinition". An example Full Frame event may be shown below:

```
<Rule>
...
<EventDefinition xsi:type="FullFrameEventDefinition">
<Classifications>
    <Classification>Vehicle</Classification>
</Classifications>
<Actions>
    <Action xsi:type="EnterAreaAction" />
    <Action xsi:type="ExitAreaAction" />
</Actions>
<Filters>
    <Filter xsi:type="MaximumSizeFilter">
        <NearRectangle>
            <X>0.2</X>
            <Y>0.3</Y>
            <Width>0.2</Width>
            <Height>0.2</Height>
        </NearRectangle>
        <FarRectangle>
```

-continued

```
            <X>0.5</X>
            <Y>0.6</Y>
            <Width>0.4</Width>
            <Height>0.3</Height>
        </FarRectangle>
        </Filter>
    </Filters>
    </EventDefinition>
    ...
</Rule>
```

As defined in the previous section, the Actions property lists the operations that may be detected. The list of valid actions may be defined in the AnalyticsCapabilites. If an action may be specified in the rule that may be not allowed, a 400 may be returned.

5.1.6. Camera Tamper

A Scene Change event caused by camera movement relative to the scene may be defined by xsi:type="CameraTamperEventDefinition". An example camera tamper event may be shown below:

```
<Rule>
    ...
    <EventDefinition xsi:type="CameraTamperEventDefinition"/>
    ...
</Rule>
```

Camera tamper events occur when the live camera feed has come to differ significantly from the scene stored in memory.

5.2. Responses

The rule contains a single optional response for when the event may be triggered. When an event may be triggered, either an alert or count may be generated but only the alert may contain the message and custom response fields (if defined). An example ResponseDefinition may be shown below.

```
<Rule>
    ...
    <ResponseDefinition xsi:type="SimpleMessageResponse">
    <Message>Tripwire crossed</Message>
    <CustomResponseFields>
    <CustomResponseField>
        <Key>drycontact</Key>
        <Value>1</Value>
    </CustomResponseField>
    <CustomResponseField>
        <Key>email</Key>
        <Value>sally@acme.com</Value>
    </CustomResponseField>
    </CustomResponseFields>
    </ResponseDefinition>
    ...
</Rule>
```

The custom response fields may be optional. In the example above, both a dry contact relay and e-mail response may be included. The drycontact Value of 1 indicates that a dry contact relay would be triggered in response to the event. External equipment such as strobe units, audible units, or access control systems can then pick up the relay. The email response Value may be the e-mail address to which alert notifications may be sent. The number of fields may be variable, but a maximum number may be established in AnalyticsCapabilities.

5.3. Schedules

A rule can have an optional schedule. If no schedule may be specified, the rule may run all the time. Currently the only available schedule type may be one based on a recurring weekly basis as specified by the xsi:type="RecurringWeeklySchedule". This type of schedule can have one or more time blocks depending on the complexity. A time block can span days. For example, a schedule could be defined to cover 9 AM to 6 PM. A schedule looks like this:

```
<Rule>
    ...
    <Schedule xsi:type="RecurringWeeklySchedule">
        <TimeBlocks>
        <TimeBlock>
            <StartDayOfWeek>1</StartDayOfWeek>
            <EndDayOfWeek>1</EndDayOfWeek>
            <StartMinuteOfDay>540</StartMinuteOfDay>
            <EndMinuteOfDay>1020</EndMinuteOfDay>
        </TimeBlock>
        <TimeBlock>
            <StartDayOfWeek>2</StartDayOfWeek>
            <EndDayOfWeek>2</EndDayOfWeek>
            <StartMinuteOfDay>540</StartMinuteOfDay>
            <EndMinuteOfDay>1020</EndMinuteOfDay>
        </TimeBlock>
        </TimeBlocks>
    </Schedule>
    ...
</Rule>
```

The TimeBlocks property contains one or more TimeBlock sections. Each TimeBlock has a StartDayOfWeek and EndDayOfWeek which defines the starting and ending days, respectively. The values range from 0 to 6 which correspond to Sunday to Saturday. A single TimeBlock can span one or more days. The StartMinuteOfDay and EndMinuteOfDay define the starting minute in the day and ending minute of the day. These values range from 0 to 1439 (11:59 PM).

5.4. Filters

A rule can have zero or more filters defined, but only one of each type. The actual type of each filter may be listed in the xsi:type attribute for each filter. The available types of filters for each channel can be determined by the AnalyticsCapabilities for the channel.

Note that when IsPeopleOnlyTrackerEnabled may be set to true, filters may be not allowed for any rule. For example, with this setting set to false a Tripwire can be added with a filter. When IsPeopleOnlyTrackerEnabled may be set to true, adding this same rule may fail with an HTTP status code of 400.

5.4.1. Maximum Size Filter

The Maximum Size filter may prevent an event from triggering if the target may be larger than the size specified in the filter. The filter may be specified with near and far rectangles. The near rectangle represents the maximum target size closer to the camera while the far rectangle represents the maximum target size farther away. The near rectangle may be typically larger and the bottom of the rectangle may be lower than the far rectangle. The system may interpolate between these two rectangles to compute a corresponding rectangle for any point in the image. If the target may be larger than the computed rectangle at that location, the event may not trigger.

```
<EventDefinition>
    ...
    <Filter xsi:type="MaximumSizeFilter">
        <NearRectangle>
        <X>0.2</X>
```

```
            <Y>0.3</Y>
            <Width>0.2</Width>
            <Height>0.2</Height>
        </NearRectangle>
        <FarRectangle>
            <X>0.5</X>
            <Y>0.6</Y>
            <Width>0.4</Width>
            <Height>0.3</Height>
        </FarRectangle>
    </Filter>
</EventDefinition>
...
```

The NearRectangle and FarRectangle properties define the rectangle coordinates in normalized form.

5.4.2. Minimum Size Filter

The Minimum Size filter may be the opposite of the Maximum Size filter. Any targets smaller than the size specified in the filter may not trigger the event. The XML specification may be exactly the same as the Maximum Size filter except the xsi:type. The difference may be bolded in the example below.

```
<EventDefinition>
...
<Filters>
    <Filter xsi:type="MinimumSizeFilter">
        <NearRectangle>
            <X>0.2</x>
            <Y>0.3</Y>
            <Width>0.2</Width>
            <Height>0.2</Height>
        </NearRectangle>
        <FarRectangle>
            <X>0.5</x>
            <Y>0.6</Y>
            <Width>0.4</Width>
            <Height>0.3</Height>
        </FarRectangle>
    </Filter>
</Filters>
</EventDefinition>
```

5.4.3. Maximum Size Change Filter

The Maximum Size Change filter may prevent an event from triggering if the target size changes drastically between frames. The amount of size change may be listed as a ratio between the current target size and the previous one. An example of a Maximum Size Change filter may be shown below.

```
<EventDefinition>
...
<Filters>
<Filter xsi:type="MaximumSizeChangeFilter">
    <MaxSizeChangeRatio>1.5</MaxSizeChangeRatio>
</Filter>
</Filters>
</EventDefinition>
...
```

The MaxSizeChangeRatio may be a floating point number. For example, a change ratio of 1.5 means that if the target size changes by 1.5× (either larger or smaller) from the previous frame, the target may be ignored.

5.4.4. Shape and Direction Filter

The Shape and Direction filter may prevent an event from triggering if the target does not have a consistent shape and the components of the shape do not move in a uniform direction. Glare that appears in sunlit water may be an example of when this would be used. An example of a Shape and Direction filter XML may be shown below.

```
<EventDefinition>
...
<Filters>
<Filter xsi:type="ShapeAndDirectionFilter"/>
</Filters>
</EventDefinition>
...
```

This filter has no properties.

6. Event Output

Events may be output in two forms: alerts and counts. The primary difference between these two output types may be that alert output contains the full information about the alert including snapshots (if supported) and target information, whereas the count contains the numerical value to reduce bandwidth. Alerts may be typically geared towards security applications while counts may be geared towards business intelligence applications, although there may be overlap between these needs and the output type may be dependent on the license. Depending on the rule and output mechanism, the numerical value for counts could be cumulative (e.g., the number of times a Tripwire was crossed) or instantaneous (e.g., the number of people in the area at this exact moment).

The two mechanisms to receive alert or count data may be either on a request basis (polling) or through an asynchronous mechanism (streaming) at both the channel and device level.

Polling requires an application to request the alert or count information as needed and the frequency may be determined by the application. Polling for alerts returns the list of all alerts in the device's buffer (the size of the buffer can be retrieved as part of the DeviceConfiguration) for the whole device or a specific channel. Depending on the frequency of polling, an application may receive duplicates from previous requests or may have missed some alerts altogether. Each alert has an ID to help the application reconcile alert lists.

Polling for counts does not return all the individual counts that may be stored in the device buffer. Because of the nature of polling and the possibly limited buffer on a device, this approach may miss too many counts. Instead, polling returns a count tally for each rule. This tally may be how many times the rule triggered since the tally was last reset.

Streaming of alert and count data pushes the information to an application as the events happen. Unlike polling, this mechanism may be best suited for when the application needs every event as there may be less likelihood of missed events as long as there may be a listening client. Polling may be useful for dashboard-like applications such as a web application hosted directly on the device, although it may be not limited to such applications.

6.1. Event Polling

An application can poll for alerts and count tallies through standard HTTP calls. These calls may be similar to the other APIs defined throughout this document where the call returns immediately after the call.

Event polling may be separated into two APIs. One API may be for alert polling while the other may be for count tally polling. Each returns a different data type.

6.1.1. Alert Polling

An application can retrieve a list of the current alerts in the device's buffer either for the whole device or a specific channel. The number of alerts available in the list may be dependent on the device. This number can be obtained through the DeviceConfiguration type.

To retrieve the alerts for the whole device, the URI may be /api.rest/alerts. To retrieve alerts for a specific channel the URI may be [channel root]/alerts. In either case, the XML for the alert list looks like this:

```
<?xml version="1.0" encoding="utf-8"?>
<AnalyticsAlertList
        xmlns:xsi="http://www.w3.org/2001/XMLSchema-instance"
        xmlns:xsd="http://www.w3.org/2001/XMLSchema"
        xmlns:xlink="http://www.w3.org/1999/xlink"
        xmlns="http://www/objectvideo.com/schemas/ovready">
    <AnalyticsAlertSummary xlink:type="simple"
            xlink:href="/api.rest/alerts/1020">
        <ID>1020</ID>
        <Timestamp>2007-03-15T16:49:04.242</Timestamp>
        <Message>Person crossed tripwire</Message>
        <RuleInfo xlink:type="simple"
                xlink:href="[channel root]/rules/rule001">
            <ID>rule001</ID>
            <Name>Tripwire rule</Name>
        </RuleInfo>
        <ViewInfo xlink:type="simple"
                xlink:href="[channel root]/views/view001">
            <ID>view001</ID>
            <Name>Parking Lot</Name>
        </ViewInfo>
    </AnalyticsAlertSummary>
    <AnalyticsAlertSummary xlink:type="simple"
            xlink:href="/api.rest/alerts/1021">
        <ID>1021</ID>
        <Timestamp>2007-03-15T16:51:44.444</Timestamp>
        <Message>Person crossed tripwire</Message>
        <RuleInfo xlink:type="simple"
                xlink:href="/[channel root]/rules/rule001">
            <ID>rule001</ID>
            <Name>Tripwire rule</Name>
        </RuleInfo>
        <ViewInfo xlink:type="simple"
                xlink:href="/[channel root]/views/view001">
            <ID>view001</ID>
            <Name>Parking Lot</Name>
        </ViewInfo>
    </AnalyticsAlertSummary>
    <AnalyticsAlertSummary xlink:type="simple"
            xlink:href"http://server/api.rest/alerts/1022">
        <ID>1022</ID>
        <Timestamp>2007-03-15T16:51:54.545</Timestamp>
        <Message>Person loiters</Message>
        <RuleInfo xlink:type="simple"
                xlink:href="/[channel root]/rules/rule002">
            <ID>rule002</ID>
            <Name>Loiters rule</Name>
        </RuleInfo>
        <ViewInfo xlink:type="simple"
                xlink:href="[channel root]/views/view001">
            <ID>view001</ID>
            <Name>Parking Lot</Name>
        </ViewInfo>
    </AnalyticsAlertSummary>
</AnalyticsAlertList>
```

Each alert in the alert list has its own AnalyticsAlertSummary.

Each alert contains a TimeStamp that provides the event detection time, down to the millisecond.

The RuleInfo property identifies the rule for which the alert has been triggered by providing both the name of the rule provided by the system (the ID) as well as the user-configurable name (the Name).

If the rule may be created for a particular sensor view, the ViewInfo property identifies the view. The name of the view assigned by the system may be the ID, and the user-configurable name may be the Name.

To retrieve the full alert information, an application uses the /api.rest/alerts/[alert id] URI. An alert looks like this:

```
<?xml version="1.0" encoding="utf-8"?>
<AnalyticsAlert
xmlns:xsi="http://www.w3.org/2001/XMLSchema-instance"
        xmlns:xsd="http://www.w3.org/2001/XMLSchema"
        xmlns:xlink="http://www.w3.org/1999/xlink"
        xmlns="http://www/objectvideo.com/schemas/ovready">
    <ID>1009</ID>
    <Timestamp>2007-03-12T12:29:02.222</Timestamp>
    <Message>Person crossed tripwire</Message>
    <RuleInfo xlink:type="simple"
            xlink:href="[channel root]/rules/rule001">
        <ID>rule001</ID>
        <Name>Tripwire rule</Name>
    </RuleInfo>
    <ViewInfo xlink:type="simple"
            xlink:href="[channel root]/views/view001">
        <ID>view001</ID>
        <Name>Parking Lot</Name>
    </ViewInfo>
    <CustomResponseFields>
        <CustomResponseField>
            <Key>drycontact</Key>
            <Value>1</Value>
        </CustomResponseField>
        <CustomResponseField>
            <Key>email</Key>
            <Value>sally@acme.com</Value>
        </CustomResponseField>
    </CustomResponseFields>
    <EventSynopsis xsi:type="TripwireEventSynopsis">
        <TripwireDirection>LeftToRight</TripwireDirection>
        <Points>
            <Point>
                <X>0.2</X>
                <Y>0.6</Y>
            </Point>
            <Point>
                <X>0.2</X>
                <Y>0.8</Y>
            </Point>
            <Point>
                <X>0.4</X>
                <Y>0.8</Y>
            </Point>
        </Points>
    </EventSynopsis>
    <TargetSlices>
        <TargetSlice>
            <TimeOffset>0</TimeOffset>
            <TargetID>135038</TargetID>
            <BoundingBox>
                <X>0.728125</X>
                <Y>0.9041667</Y>
                <Width>0.06875</Width>
                <Height>0.0541666</Height>
            </BoundingBox>
            <Classification>Human</Classification>
        </TargetSlice>
        <TargetSlice>
            <TimeOffset>100</TimeOffset>
            <TargetID>135038</TargetID>
            <BoundingBox>
                <X>0.734565</X>
                <Y>0.9123667</Y>
                <Width>0.06875</Width>
                <Height>0.0541666</Height>
            </BoundingBox>
            <Classification>Human</Classification>
        </TargetSlice>
    </TargetSlices>
    <Snapshots>
        <Snapshot xlink:type="simple"
                xlink:href="/api.rest/images/alert001-1.jpg" />
```

```
    <Snapshot xlink:type="simple"
        xlink:href="/api.rest/images/alert001-2.jpg" />
</Snapshots>
<DayImage xlink:type="simple"
        xlink:href="/api.rest/images/view001-day.jpg" />
</AnalyticsAlert>
```

The full alert information provided when you poll by alert ID provides the same time stamp, rule identification, and view identification information that you would receive if you polled by channel root (see above). The full alert information, however, also includes information about the object(s) involved in the event and any video images that might be included with the alert as snapshots.

The CustomResponseFields may be an optional property that may list all the fields as defined in the rule's response section, if any exists.

The EventSynopsis property provides a brief description of the event that was triggered, allowing an application to provide context for the alert without retrieving and storing the full rule. The actual type of the event synopsis may be listed in the xsi:type attribute and matches the corresponding EventDefinition specified in the rule.

Object information may be detailed within the TargetSlice properties. Depending on the event type, there may be one or more TargetSlices for a particular event. Each TargetSlice describes the object at a specific time relative to the time the event occurred (indicated by the Timestamp). This may be useful if an alert includes more than one snapshot to illustrate how an object was in motion around the time the event occurred.

Each TargetSlice's TimeOffset may be the time (in milliseconds) since the time the event occurred. The first TargetSlice always indicates the time of event detection and so the TimeOffset may be 0. The other TimeSlice's TimeOffset may be the number of milliseconds prior to when the event occurred.

In the example above, the first TargetSlice's TimeOffset may be 0, indicating the time of event detection, and the second TimeSlice's TimeOffset may be 100, or 1/10 of a second before the event occurred.

Each TargetSlice includes a TargetID, which may be used to identify and track each object as it moves from frame to frame. For each object, the BoundingBox property provides the position and size for a rectangle that could appear around the object in an alert snapshot. The X and Y coordinates provide the upper left corner of the rectangle, with the Width and Height properties providing the rectangle dimensions from that point.

Note only a reference to the rule may be included. If an application wants to store the definition of the rule that generated this alert, the application should follow the Rule XLINK to retrieve the full rule (or access a cached copy).

To retrieve the original snapshots, an application should follow the URI listed in the XLINK attribute of each Snapshot or DayImage property. The DayImage may be optional and may only be included if the AlertConfiguration on the channel enables this feature.

Note that the snapshot URI listed in the XLINK attribute may or may not be rooted under the /api.rest path. It may be up to the device to provide a meaningful path based on its configuration. Regardless of where the URI may be rooted, the authorization permissions to retrieve these snapshots should, at a minimum, allow the same caller who retrieved the alert to retrieve the snapshot.

If the AlertConfiguration allows snapshots to be inline, the Snapshot or DayImage body may contain a Base64-encoded image instead of the XLINK attribute as shown below (only the Snapshots property may be shown).

```
<Snapshots>
    <Snapshot>
        <Image>fhdsj...base64encoded...hfkhjs=</Image>
    </Snapshot>
    <Snapshot>
        <Image>sfhue...base64encoded...djhsk5e</Image>
    </Snapshot>
</Snapshots>
<DayImage>
    <Image>eee3j...base64encoded...hfkhjs=</Image>
</DayImage>
```

The API also supports deleting all or some of the alerts on the device. To delete all the alerts on the device, an application sends a DELETE to the /api.rest/alerts URI. To delete all alerts for a channel, an application sends a DELETE to the [channel root]/alerts URI. To delete an individual alert, an application sends a DELETE to /api.rest/alerts/[alert id].

Snapshots with markup, which typically includes bounding box around the target slice and rule definition drawn graphically as an overlay, may be generated by an application and not the device. This allows an application full control over the markup from different devices for consistency. An application can create the markup for a given alert by using the target slice information as well as the rule definition itself.

An example of each EventSynopsis may be listed below.

```
<EventSynopsis xsi:type="TripwireEventSynopsis">
    <TripwireDirection>LeftToRight</TripwireDirection>
    <Points>
        <Point>
            <X>0.2</X>
            <Y>0.6</Y>
        </Point>
        <Point>
            <X>0.2</X>
            <Y>0.8</Y>
        </Point>
        <Point>
            <X>0.4</X>
            <Y>0.8</Y>
        </Point>
    </Points>
</EventSynopsis>
<EventSynopsis xsi:type="FullFrameEventSynopsis">
    <Actions>
        <Action xsi:type="EnterAreaAction" />
    </Actions>
</EventSynopsis>
<EventSynopsis xsi:type="MultiLineTripwireEventSynopsis">
    <LineCrossingOrder>Before</LineCrossingOrder>
    <Duration>0</Duration>
    <Tripwires>
        <Tripwire>
            <TripwireDirection>LeftToRight</TripwireDirection>
            <Points>
                <Point>
                    <X>0.2</X>
                    <Y>0.6</Y>
                </Point>
                <Point>
                    <X>0.2</X>
                    <Y>0.8</Y>
                </Point>
            </Points>
        </Tripwire>
        <Tripwire>
            <TripwireDirection>LeftToRight</TripwireDirection>
            <Points>
```

```
            <Point>
                <X>0.6</X>
                <Y>0.6</Y>
            </Point>
            <Point>
                <X>0.6</X>
                <Y>0.8</Y>
            </Point>
        </Points>
    </Tripwire>
</Tripwires>
</EventSynopsis>
<EventSynopsis xsi:type="AreaOfInterestEventSynopsis">
<Points>
    <Point>
        <X>0.2</X>
        <Y>0.6</Y>
    </Point>
    <Point>
        <X>0.2</X>
        <Y>0.8</Y>
    </Point>
    <Point>
        <X>0.6</X>
        <Y>0.6</Y>
    </Point>
    <Point>
        <X>0.6</X>
        <Y>0.8</Y>
    </Point>
</Points>
<Actions>
    <Action xsi:type="EnterAreaAction" />
</Actions>
</EventSynopsis>
<EventSynopsis xsi:type="CameraTamperEventSynopsis" />
```

6.1.2. Count Tally Polling

An application can retrieve a list of the current tally for each rule for the whole device or a specific channel. This number can reflect one of two things depending on the rule type. There may be two general types of rules specific to counting: triggered rules or data rules.

Triggered rules may be created to detect events such as crossing a Tripwire or entering an area of interest. The event may be triggered when that rule's conditions may be met. The tally of triggered rules may be just a running total of the number of times that the rule's conditions were met since the last time the count was reset.

Dwell Threshold and Occupancy Threshold rules may be considered triggered rules. The tally shows how many times the threshold conditions were met.

Occupancy Data may be the one type of data rule for count tally. An Occupancy Data rule outputs the number of people that may be currently occupying an area. The rule may be not triggered, but just sends the data whenever the count changes. In this case, the number reflected may be the latest count from the data rule.

There may be one other type of data rule called Dwell Data which outputs the amount of time a person was in an area upon that person leaving. These rules may be not part of the tally list and can only be streamed.

To retrieve the count tallies for the whole device, the URI may be /api.rest/tallycounts. To retrieve count tallies for a specific channel the URI may be [channel root]/tallycounts. In either case, the XML for the count tally list looks like this:

```
<?xml version="1.0" encoding="utf-8"?>
<AnalyticsTallyList
    xmlns:xsi="http://www.w3.org/2001/XMLSchema-instance"
    xmlns:xsd="http://www.w3.org/2001/XMLSchema"
    xmlns:xlink="http://www.w3.org/1999/xlink"
    xmlns="http://www.objectvideo.com/schemas/ovready">
<AnalyticsTally xlink:type="simple"
    xlink:href="[channel root]/rules/rule001/count">
    <Count>15</Count>
    <CountRuleType>TriggeredRule</CountRuleType>
    <Modified>2007-03-15T16:49:04.242</Modified>
    <LastReset>2007-03-15T16:49:04.242</LastReset>
    <SupportsReset>true</SupportsReset>
    <RuleInfo xlink:type="simple"
        xlink:href="[channel root]/rules/rule001">
        <ID>rule001</ID>
        <Name>Tripwire rule</Name>
    </RuleInfo>
    <ViewInfo xlink:type="simple"
        xlink:href="[channel root]/views/view001">
        <ID>view001</ID>
        <Name>Parking Lot</Name>
    </ViewInfo>
</AnalyticsTally>
<AnalyticsTally xlink:type="simple"
    xlink:href="[channel root]/rules/rule003/count">
    <Count>0</Count>
    <CountRuleType>OccupancyDataRule</CountRuleType>
    <Modified>2007-03-15T16:51:03.123</Modified>
    <LastReset>0000-00-00T00:00:00.000</LastReset>
    <SupportsReset>false</SupportsReset>
    <RuleInfo xlink:type="simple"
        xlink:href="[channel root]/rules/rule003">
        <ID>rule003</ID>
        <Name>Occupancy Rule</Name>
    </RuleInfo>
    <ViewInfo xlink:type="simple"
        xlink:href="[channel root]/views/view002">
        <ID>view002</ID>
        <Name>Conference Room</Name>
    </ViewInfo>
</AnalyticsTally>
<AnalyticsTally xlink:type="simple"
    xlink:href="[channel root]/rules/rule002/count">
    <Count>23</Count>
    <CountRuleType>TriggeredRule</CountRuleType>
    <Modified>2007-03-15T16:52:04.242</Modified>
    <LastReset>0000-00-00T00:00:00.000</LastReset>
    <SupportsReset>true</SupportReset>
    <RuleInfo xlink:type="simple"
        xlink:href="[channel root]/rules/rule002">
        <ID>rule002</ID>
        <Name>Loiters rule</Name>
    </RuleInfo>
    <ViewInfo xlink:type="simple"
        xlink:href="[channel root]/views/view001">
        <ID>view001</ID>
        <Name>Parking Lot</Name>
    </ViewInfo>
</AnalyticsTally>
</AnalyticsTallyList>
```

Note that if there may be no tallies at time of polling, the GET /api.rest/counts call may return an HTTP status code of 204 and no content.

Each event listed in the AnalyticsTallyList may be described by a separate AnalyticsTally entry.

The Count property may be the tally of the total number of times a rule was triggered or the number of people counted with an Occupancy Data rule.

The CountRuleType indicates whether the event may be defined under a triggered rule or current data as part of an Occupancy Data event. The two allowed types for a tally may be TriggeredRule and OccupancyDataRule.

The Modified property indicates the last time the count was updated either by triggering the rule or resetting the count (if supported).

LastReset indicates the last time the tally was reset. If this value may be the same as the Modified value, the tally has not been reset since the time it was incremented. If this value has not been reset, it may be "0000-00-00T00:00:00.000".

The rule cannot be reset unless the SupportsReset value may be true.

The RuleInfo property identifies the rule for which the event has been triggered by providing both the name of the rule provided by the system (the ID) as well as the user-configurable name (the Name).

If the rule may be created for a particular sensor view, the ViewInfo property identifies the view. The name of the view assigned by the system may be the ID, and the user-configurable name may be the Name.

The API also supports obtaining the current tally for an individual rule through the [channel root]/rules/[rule id]/count URI (as seen in the AnalyticsTally XLINK attribute). The response may be an AnalyticsTally as defined in the example above.

In addition, an individual count tally can be reset (if supported) by sending back a CountValue with the Count property set to the desired number to the [channel root]/rules/[rule id]/count/revisedvalue URI. An example of the CountValue XML may be shown below. When the value may be sent to the device, the LastReset time may be set to the current device time.

```
<?xml version="1.0" encoding="utf-8"?>
<CountValue xmlns:xsi="http://www.w3.org/2001/XMLSchema-instance"
    xmlns:xsd="http://www.w3.org/2001/XMLSchema"
    xmlns="http://www.objectvideo.com/schemas/ovready">
<Count>0</Count>
</CountValue>
```

6.2. Event Streaming

As an alternative to using the above APIs, both alerts and counts can be streamed to a waiting application on the same connection. A client application would make a request for asynchronous events on a socket that may be dedicated to receiving events. Once the device receives this request, it may maintain the connection and send out events as they happen to the waiting applications. Events can be streamed for the entire device or on a specific channel. To retrieve events for the whole device with a single connection, the URI is /api.rest/eventstream. To retrieve events for a specific channel the URI is [channel root]/eventstream. In this case each channel would require a separate connection. To selectively retrieve events from one or more channels using a single connection, the URI may be the same as the whole device but one or more channels can be specified as query parameters. The general form is: /api.rest/eventstream?channel=id& . . . &channel=id. For example, the URI to retrieve events from both channels 0 and 2 is: /api.rest/eventstream?channel=0&channel=2. The output format should follow the multi-part MIME format as shown below with the addition of an X-OVReady-Event-Type header to allow an application to easily distinguish between alerts and counts.

A true alert push mechanism from the device to a waiting application may also be provided. In this approach, the device contacts the waiting application whenever an alert occurs.

The format of the XML for alerts may differ slightly from the XML format of the counts. Alerts may be in the same format as the AnalyticsAlert shown above.

Counts may be different from the AnalyticsTally in that they represent each time the rule was triggered (for triggered rules) or the data changes (for data rules). For triggered rules the count may be typically 1 while for data rules the count represents the current value of that rule. For Dwell Data rules, the Duration property provides the number of milliseconds that the person dwelled. Examples for a triggered rule, Occupancy Data rule, and Dwell Data rule may be provided below.

Triggered Rule Count

```
<?xml version="1.0" encoding="utf-8"?>
<AnalyticsCount xmlns:xsi="http://www.w3.org/2001/
    XMLSchema-instance"
    xmlns:xsd="http://www.w3.org/2001/XMLSchema"
    xmlns:xlink="http://www.w3.org/1999/xlink"
    xmlns="http://www.objectvideo.com/schemas/ovready">
<Count>1</Count>
<CountRuleType>TriggeredRule</CountRuleType>
<Duration>0</Duration>
<Timestamp>2007-03-15T16:49:04.242</Timestamp>
<RuleInfo xlink:type="simple"
    xlink:href="[channel root]/rules/rule001">
<ID>rule001</ID>
<Name>Tripwire rule</Name>
</RuleInfo>
<ViewInfo xlink:type="simple"
    xlink:href="[channel root]/views/view001">
<ID>view001</ID>
<Name>Parking Lot</Name>
</ViewInfo>
</AnalyticsCount>
```

Occupancy Data Rule Count

```
<?xml version="1.0" encoding="utf-8"?>
<AnalyticsCount xmlns:xsi="http://www.w3.org/2001/
    XMLSchema-instance"
    xmlns:xsd="http://www.w3.org/2001/XMLSchema"
    xmlns:xlink="http://www.w3.org/1999/xlink"
    xmlns="http://www.objectvideo.com/schemas/ovready">
<Count>9</Count>
<CountRuleType>OccupancyDataRule</CountRuleType>
<Duration>0</Duration>
<Timestamp>2007-03-15T16:51:03.123</Timestamp>
<RuleInfo xlink:type="simple"
    xlink:href="[channel root]/rules/rule003">
<ID>rule003</ID>
<Name>Occupancy rule</Name>
</RuleInfo>
<ViewInfo xlink:type="simple"
    xlink:href="[channel root]/views/view002">
<ID>view002</ID>
<Name>Conference Room</Name>
</ViewInfo>
</AnalyticsCount>
```

Dwell Data Rule Count

```
<?xml version="1.0" encoding="utf-8"?>
<AnalyticsCount xmlns:xsi="http://www.w3.org/2001/
    XMLSchema-instance"
    xmlns:xsd="http://www.w3.org/2001/XMLSchema"
    xmlns:xlink="http://www.w3.org/1999/xlink"
    xmlns="http://www.objectvideo.com/schemas/ovready">
<Count>1</Count>
<CountRuleType>DwellDataRule</CountRuleType>
<Duration>60000</Duration>
<Timestamp>2007-03-15T16:52:14.123</Timestamp>
<RuleInfo xlink:type="simple"
    xlink:href="[channel root]/rules/rule004">
<ID>rule004</ID>
<Name>Dwell rule</Name>
</RuleInfo>
<ViewInfo xlink:type="simple"
    xlink:href="[channel root]/views/view002">
<ID>view002</ID>
<Name>Conference Room</Name>
</ViewInfo>
</AnalyticsCount>
```

Each streamed event may be described by a separate AnalyticsCount entry.

For triggered rules and Dwell Data rules, the Count may be 1. For Occupancy Data rules, the Count may be the current occupancy in the area, if any, defined in the rule.

The CountRuleType indicates whether the event may be defined under a triggered rule or incremented data as part of a counting-related (i.e., Dwell or Occupancy) event. The allowed types may be TriggeredRule, OccupancyDataRule, and DwellDataRule.

The Duration property refers to the amount of time objects have remained in an area of interest. As such, this property may be only meaningful for Dwell Data rules. For triggered rules and occupancy rules, the Duration value may be 0. For example, if two people left an area of interest, two AnalyticsCounts may be generated. Each AnalyticsCount would have a Count of 1, but the Duration would indicate how many milliseconds the person was in the area of interest before leaving.

The TimeStamp may be the time, down to the millisecond, at which the event was triggered or counting data changed.

The RuleInfo property identifies the rule for which the event has been triggered by providing both the name of the rule provided by the system (the ID) as well as the user-configurable name (the Name).

If the rule may be created for a particular sensor view, the ViewInfo property identifies the view. The name of the view assigned by the system may be the ID, and the user-configurable name may be the Name.

Not shown in the XML above may be the optional CustomResponseFields property. This may be allowed on both AnalyticsAlert and AnalyticsCount types. For example, this would allow a listening application to play a sound when an Occupancy Threshold event has been triggered.

An example that shows both alerts and counts on the same stream, using the default (x-identity) encoding may be shown below. Note the use of the X-OVReady-Event-Type header. This can be either AnalyticsCount or AnalyticsAlert.

```
MIME-Version: 1.0
Content-Type: multipart/mixed; boundary="--ovready"
----ovready
Content-Type: application/xml; charset="utf-8"
Content-Length: 752
X-OVReady-Event-Type: AnalyticsCount
<?xml version="1.0" encoding="utf-8"?>
<AnalyticsCount xmlns:xsi="http://www.w3.org/2001/
XMLSchema-instance"
    xmlns:xsd="http://www.w3.org/2001/XMLSchema"
    xmlns:xlink="http://www.w3.org/1999/xlink"
    xmlns="http://www.objectvideo.com/schemas/ovready">
<Count>9</Count>
<CountRuleType>OccupancyDataRule</CountRuleType>
<Duration>0</Duration>
<Timestamp>2007-03-15T16:51:03.123</Timestamp>
<RuleInfo xlink:type="simple"
    xlink:href="[channel root]/rules/rule003">
<ID>rule003</ID>
<Name>Occupancy rule</Name>
</RuleInfo>
<ViewInfo xlink:type="simple"
    xlink:href="[channel root]/views/view002">
<ID>view002</ID>
<Name>Conference Room</Name>
</ViewInfo>
</AnalyticsCount>
----ovready
Content-Type: application/xml; charset="utf-8"
Content-Length: 1656
X-OVReady-Event-Type: AnalyticsAlert
<?xml version="1.0" encoding="utf-8"?>
<AnalyticsAlert xmlns:xsi="http://www.w3.org/2001/
XMLSchema-instance"
    xmlns:xsd="http://www.w3.org/2001/XMLSchema"
    xmlns:xlink="http://www.w3.org/1999/xlink"
    xmlns="http://www.objectvideo.com/schemas/ovready">
<ID>1009</ID>
<Timestamp>2007-03-12T12:29:02.222</Timestamp>
<Message>Person crossed tripwire</Message>
<RuleInfo xlink:type="simple"
    xlink:href="[channel root]/rules/rule001">
<ID>rule001</ID>
<Name>Tripwire rule</Name>
</RuleInfo>
<ViewInfo xlink:type="simple"
    xlink:href="[channel root]/views/view001">
<ID>view001</ID>
<Name>Parking Lot</Name>
</ViewInfo>
<EventSynopsis xsi:type="TripwireEventSynopsis">
<TripwireDirection>LeftToRight</TripwireDirection>
<Points>
    <Point>
    <X>0.2</X>
    <Y>0.6</Y>
    </Point>
    <Point>
    <X>0.2</X>
    <Y>0.8</Y>
    </Point>
    <Point>
    <X>0.4</X>
    <Y>0.8</Y>
    </Point>
</Points>
</EventSynopsis>
<TargetSlices>
<TargetSlice>
    <TimeOffset>0</TimeOffset>
    <TargetID>135038</TargetID>
    <BoundingBox>
    <X>0.728125</X>
    <Y>0.9041667</Y>
    <Width>0.06875</Width>
    <Height>0.0541666</Height>
    </BoundingBox>
    <Classification>Human</Classification>
</TargetSlice>
<TargetSlice>
    <TimeOffset>100</TimeOffset>
    <TargetID>135038</TargetID>
    <BoundingBox>
    <X>0.734565</X>
    <Y>0.9123667</Y>
    <Width>0.06875</Width>
    <Height>0.0541666</Height>
    </BoundingBox>
    <Classification>Human</Classification>
</TargetSlice>
</TargetSlices>
<Snapshots>
<Snapshot xlink:type="simple"
    xlink:href="/api.rest/images/alert001-1.jpg" />
<Snapshot xlink:type="simple"
    xlink:href="/api.rest/images/alert001-2.jpg" />
</Snapshots>
</AnalyticsAlert>
----ovready
...
```

Note that the only two encoding types currently supported for event streaming may be x-identity and x-deflate. The x-xml-token and x-xml-token-deflate types may be not supported.

7. User Management

User management may be a part of the protocol. User management enables authentication and authorization. The security model may be based upon role-based authorization.

7.1. Roles

To get the list of roles for the device, an application does a GET. The list of roles looks like this:

```
<?xml version="1.0" encoding="utf-8"?>
<RoleList xmlns:xsi="http://www.w3.org/2001/XMLSchema-instance"
    xmlns:xsd="http://www.w3.org/2001/XMLSchema"
    xmlns:xlink="http://www.w3.org/1999/xlink"
    xmlns="http://www.objectvideo.com/schemas/ovready">
<RoleSummary xlink:type="simple"
    xlink:href="/api.rest/roles/Administration">
<Name>Administration</Name>
</RoleSummary>
<RoleSummary xlink:type="simple"
    xlink:href="/api.rest/roles/RuleManagement">
<Name>RuleManagement</Name>
</RoleSummary>
<RoleSummary xlink:type="simple"
    xlink:href="/api.rest/roles/EventOutput">
<Name>EventOutput</Name>
</RoleSummary>
<RoleSummary xlink:type="simple"
    xlink:href="/api.rest/roles/TargetOutput">
<Name>TargetOutput</Name>
</RoleSummary>
<RoleSummary xlink:type="simple"
    xlink:href="/api.rest/roles/MetadataOutput">
<Name>MetadataOutput</Name>
</RoleSummary>
</RoleList>
```

There may be five pre-defined roles:

Administration—This role allows the user to perform administrative operations such as user management, device configuration, and channel configuration.

RuleManagement—This role allows the user to perform rule management operations such as adding or editing rules. This also includes view management operations.

EventOutput—This role allows the user to utilize alert and count URIs for both polling and streaming.

TargetOutput—This role allows the user to utilize the target output URIs for both polling and streaming.

MetadataOutput—This role allows the user to utilize the metadata output URI for streaming.

7.1.1. Role to User Mappings

To retrieve the list of users for a given role, an application sends a GET on the /api.rest/roles/[role name] URI, where [role name] may be the name of the role (case-sensitive). The XML for a role looks like this:

```
<?xml version="1.0" encoding="utf-8"?>
<Role xmlns:xsi="http://www.w3.org/2001/XMLSchema-instance"
    xmlns:xsd="http://www.w3.org/2001/XMLSchema"
    xmlns:xlink="http://www.w3.org/1999/xlink"
    xmlns="http://www.objectvideo.com/schemas/ovready">
<Name>EvenOutput</Name>
<Users>
    <UserInfo xlink:type="simple"
        xlink:href="/api.rest/users/frubble">
        <LoginName>frubble</LoginName>
        <FullName>Fred Rubble</FullName>
    </UserInfo>
    <UserInfo xlink:type="simple"
        xlink:href="/api.rest/users/bstone">
        <LoginName>bstone</LoginName>
        <FullName>Barney Stone</FullName>
    </UserInfo>
</Users>
</Role>
```

The Users property provides a list of users that have this role. Each UserInfo in this list provides the LoginName and FullName of the user.

7.1.2. Role Descriptions

"The XML for a role description looks like this:

```
<?xml version="1.0" encoding="utf-8"?>
<RoleDescription xmlns:xsi="http://www.w3.org/2001/
XMLSchema-instance"
    xmlns:xsd="http://www.w3.org/2001/XMLSchema"
    xmlns="http://www.objectvideo.com/schemas/ovready">
<Name>TargetOutput</Name>
<Operations>
<Operation>
    <Method>GET</Method>
    <URI>[channel root]/targets</URI>
</Operation>
<Operation>
    <Method>GET</Method>
    <URI>[channel root]/targetstream</URI>
</Operation>
</Operations>
</RoleDescription>
```

7.2. Users

To get the list of users for the device, an application does a GET. The XML for a list of users looks like this:

```
<?xml version="1.0" encoding="utf-8"?>
<UserList xmlns:xsi="http://www.w3.org/2001/XMLSchema-instance"
    xmlns:xsd="http://www.w3.org/2001/XMLSchema"
    xmlns:xlink="http://www.w3.org/1999/xlink"
    xmlns="http://www.objectvideo.com/schemas/ovready">
<UserSummary xlink:type="simple"
    xlink:href="/api.rest/users/admin">
<LoginName>admin</LoginName>
<FullName>Administrator</FullName>
<Roles>
    <Role>Administration</Role>
</Roles>
</UserSummary>
<UserSummary xlink:type="simple"
    xlink:href="/api.rest/users/frubble">
<LoginName>frubble</LoginName>
<FullName>Fred Rubble</FullName>
<Roles>
    <Role>Rulemanagement</Role>
    <Role>EventOutput</Role>
</Roles>
</UserSummary>
<UserSummary xlink:type="simple"
    xlink:href="/api.rest/users/bstone">
<LoginName>bstone</LoginName>
<FullName>Barney Stone</FullName>
<Roles>
    <Role>EventOutput</Role>
</Roles>
</UserSummary>
<UserList>
```

The LoginName may be the name that the user logs into the system with. The FullName may be the full name of the user. The LoginName minimum and maximum length may be defined in the UserLoginNameMinLength and UserLoginNameMaxLength properties of DeviceLimits. The FullName follows the MaxNamePropertyLength limit.

The Roles property provides a list of roles that this user may be enabled to have.

To retrieve an individual user, an application does a GET. The XML for a User may be very similar to a UserSummary and may be shown below:

```
<?xml version="1.0" encoding="utf-8"?>
<User xmlns:xsi="http://www.w3.org/2001/XMLSchema-instance"
    xmlns:xsd="http://www.w3.org/2001/XMLSchema"
    xmlns="http://www.objectvideo.com/schemas/ovready">
<LoginName>frubble</LoginName>
<FullName>Fred Rubble</FullName>
<Roles>
<Role>RuleManagement</Role>
<Role>EventOutput</Role>
</Roles>
</User>
```

The fields of a User have been described previously as part of the UserSummary.

To add a user, an application would POST to the /api.rest/users URI. To edit a user, an application would PUT to the /api.rest/users/[loginname] URI. To add a user to one or more Roles may be specified in either of these two commands.

To add or edit a user, the XML may be very similar to what may be returned from the GET except for the PasswordScheme and Password properties (which may be never returned as part of the GET) as shown below:

```
<?xml version="1.0" encoding="utf-8"?>
<User xmlns:xsi="http://www.w3.org/2001/XMLSchema-instance"
    xmlns:xsd="http://www.w3.org/2001/XMLSchema"
    xmlns="http://www.objectvideo.com/schemas/ovready">
<LoginName>frubble</LoginName>
<FullName>Fred Rubble</FullName>
<Roles>
<Role>RuleManagement</Role>
<Role>EventOutput</Role>
</Roles>
<PasswordScheme>Basic</PasswordScheme>
<Password>hjhjksd=</Password>
</User>
```

The PasswordScheme and Password properties may be required when adding a user. If not present, an HTTP status code of 400 may be returned. These two fields may be optional when editing a user, depending on whether or not the password may be being modified. For the types of schemes and format of the password see "7.2.2.2. Encrypted Password Change Scheme" on page 107. Note that the PasswordScheme and Password properties may be not returned when retrieving a User object.

7.2.1. Changing Passwords

There may be two ways to change a password: user-changed and administrator-changed. The former may be when a user changes his or her own password. The latter may be when an administrator (a user with the Administration role) changes a user's password (e.g., when the user forgets the password).

To have a user change his or her own password, an application does a PUT to the /api.rest/users/current/password URI. The following XML may be used:

```
<?xml version="1.0" encoding="utf-8"?>
<UserPassword xmlns:xsi="http://www.w3.org/2001/
XMLSchema-instance"
    xmlns:xsd="http://www.w3.org/2001/XMLSchema"
    xmlns="http://www.objectvideo.com/schemas/ovready">
<PasswordScheme>Basic</PasswordScheme>
<NewPassword>U2tvb2x6T3V0NHZy</NewPassword>
</UserPassword>
```

The NewPassword may be encoded in one of the formats shown below to provide transmission to the device. See the next section for more details on the format. The PasswordScheme defines the type of scheme that may be being used.

To have an administrator change a user's password, the administrator updates the User object and provides the Password property. See the next section for more details on the format.

7.2.2. Password Change Specification

There may be two types of change password schemes: Basic and Encrypted. Basic, as the name suggests, provides a simple mechanism to change a user's password without encryption much like HTTP Basic provides for a simple mechanism to authenticate. For better security, the Basic scheme should be used with HTTPS or the Encrypted scheme should be used instead. The Encrypted scheme details a mechanism by which the new password may be encrypted between client and server without having to use HTTPS.

While the Encrypted scheme may be the recommended mechanism, all devices should support the Basic scheme as the Encrypted scheme may be subject to export restrictions.

In either scheme, the administrator can change a user's password or a user can change his or her own password.

7.2.2.1. Basic Password Change Scheme

The formula to encode the new password under the Basic scheme may be:

1  TempString=login-name+":"+current-password+":"+new-password
2  EncodedString=Base64(TempString)

Line 1 concatenates the login name of the person to be changed, the current password of the person changing the password, and the new password for the user with each element separated by a colon (":") character. The current-password may be either the current user's password (if he was changing his own) or the administrator's password (if the administrator may be changing a user's password). For example, if the user Fred Rubble was going to change his own password:

1  TempString="frubble"+":"+"fred-oldpass"+":"+"fred-newpass"

If the administrator were going to change Fred's password, Line 1 would be:

1  TempString="frubble"+":"+"admin-pass"+":"+"fred-newpass"

Line 2 Base64 encodes the results from Line 1.

7.2.2.2. Encrypted Password Change Scheme

The formula to encrypt the new password under the Encrypted scheme may be:

```
1 TempString = Base64 (SHA-1(login-name + ":" + current-pass)) +
    new-pass
2 Encryptionkey = Truncate(SHA-1(current-pass)) to 16 bytes
3 NewPasswordEncrypted = EncryptAES128(TempString) with
    EncryptionKey
4 NewPasswordEncoded = Base64(NewPasswordEncrypted)
```

Line 1 does several things. First, it concatenates the login name of the person to be changed with the current password of the person changing the password, separated by a colon (":") character. This may be then hashed with SHA-1 and Base64 encoded. The new password for the specific user may be then appended to this encoded value. For example, if the user Fred Rubble was going to change his own password:

```
1 TempString = Base64(SHA-1("frubble" + ":" + "fred-oldpass"))
    + "fred-newpass"
```

If the administrator were going to change Fred's password, Line 1 would be:

1   TempString=Base64(SHA-1("frubble"+":"+"admin-pass"))+"fred-newpass"

Line 2 creates an encryption key based on the password of the user changing the password. This may be done by doing an SHA-1 hash of the current user's password (20 bytes in length) and truncating to 16 bytes. For example, if the user Fred Rubble was going to change his own password:

2   EncryptionKey=Truncate(SHA-1 ("fred-oldpass")) to 16 bytes

If the administrator were going to change Fred's password, Line 2 would be:

2   EncryptionKey=Truncate(SHA-1 ("admin-pass")) to 16 bytes

Line 3 encrypts the results of Line 1 (TempString) with the results from Line 2 (EncryptionKey) with AES 128 bit encryption. This may be then Base 64 encoded as shown in Line 4.

The end result (NewPasswordEncoded) may be sent over in the NewPassword property.

The purpose behind the extra steps in Line 1 may be to ensure that the encrypted password may be transmitted correctly and was not corrupted. After reversing the steps above, if the device can match the Base64 (SHA-1(login-name+":"+current-pass)) prefix to what has been provided then the remaining bytes means the new password has not been corrupted.

8. Target Data Output

The ObjectVideo OnBoard library supports output of target tracking data for each channel and the DeviceConfiguration specifies whether this may be supported by the device. This data may be comprised of the basic information about every detected target in the frame and includes the bounding box and classification. The target data can either be retrieved as a stream (similar to the alert and count stream described previously) or via polling.

Because this data may be generated on a frame by frame basis, there may be several output formats to account for bandwidth usage.

The XML for a list of target data looks like this:

```
<?xml version="1.0" encoding="utf-8"?>
<TargetList xmlns:xsi="http://www.w3.org/2001/XMLSchema-instance"
        xmlns:xsd="http://www.w3.org/2001/XMLSchema"
        xmlns:xlink="http://www.w3.org/1999/xlink"
        xmlns="http://www.objectvideo.com/schemas/ovready">
<Timestamp>2007-03-12T12:29:02.222</Timestamp>
<ChannelInfo xlink:type="simple"
        xlink:href="/api.rest/channel/0">
<ID>0</ID>
</ChannelInfo>
<Targets>
<Target>
    <TargetID>135038</TargetID>
    <BoundingBox>
    <X>0.728125</X>
    <Y>0.9041667</Y>
    <Width>0.06875</Width>
    <Height>0.0541666</Height>
    </BoundingBox>
    <Footprint>
    <X>0.7625</X>
    <Y>0.9041667</Y>
    </Footprint>
    <Centroid>
    <X>0.7625</X>
    <Y>0.93125</Y>
    </Centroid>
    <Classification>Human</Classification>
```

```
    <EqualID>135038</EqualID>
    <Parents>
    <ParentID>135033</ParentID>
    <ParentID>135025</ParentID>
    </Parents>
</Target>
<Target>
    <TargetID>135039</TargetID>
    <BoundingBox>
    <X>0.438125</X>
    <Y>0.8941667</Y>
    <Width>0.04875</Width>
    <Height>0.0741666</Height>
    </BoundingBox>
    <Footprint>
    <X>0.4625</X>
    <Y>0.8941667</Y>
    </Footprint>
    <Centroid>
    <X>0.4625</X>
    <Y>0.93125</Y>
    </Centroid>
    <Classification>Vehicle</Classification>
    <EqualID>135035</EqualID>
    <Parents />
</Target>
</Targets>
</TargetList>
```

A TargetList represents all targets that occurred in the frame that was just analyzed. It may have one or more Target elements.

Each Target has a TargetID, which may change across frames. To track the history of an individual target, the ParentIDs (if available) and EqualID may be used.

The BoundingBox property provides the dimensions of the rectangle that appears around the object in alert snapshots. The X and Y coordinates indicate the upper left corner of the rectangle, from which the other rectangle dimensions may be extrapolated. For targets in motion, the BoundingBox dimensions may change from frame to frame.

The Footprint and Centroid properties provide additional information about the target with respect to the BoundingBox. The Footprint may be where the analytics library estimates the bottom of the target may be (or where the feet may be on a person). This may be not always at the bottom center of the target, depending on the tracker type and calibration. The Centroid property may be where the analytics library estimates the target's center of mass may be. This may not always be in the exact center of the bounding box, depending on the tracker type, calibration, and other identifying features.

The EqualID and ParentID properties allow tracking of the same target across different generations. The TargetID of the current target may change over time. In order to create a history, the ParentID may be a list of one or more TargetIDs that the current target was an immediate descendant of. In the example above, the first target (TargetID=135038) has two ParentIDs associated with it. This means that at some point in the past, this object had split from two other objects with which it had been jointly tracked. The EqualID property may be the ID that the current target was associated with in the past spanning generations. If there may be no ancestor the EqualID may be equal to the TargetID.

8.1. Target Data Polling

The first option to retrieve target data may be on-demand via polling. This allows the client to grab the target data from the last analyzed frame. The device does not keep more than a single frame of target data so if the client only polls once a second, 9 frames (assuming 10 fps) of target data may be dropped. This allows the client to easily dictate the rate of target data received.

Note that if there may be no targets at time of polling, this may return an HTTP status code of 204 and no content.

8.2. Target Data Streaming

The second option to retrieve target data may be to stream the target data to the client using multi-part MIME. This method may be similar to the alert and count streaming discussed previously. The device may stream the data out as fast as it can, but data for frames may be dropped if the client or network cannot keep up with the rate. To help with this, the data can be encoded in several different formats to reduce the bandwidth requirements.

An example may be:

```
MIME-Version: 1.0
Content-Type: multipart/mixed; boundary="--ovready"
----ovready
Content-Type: application/xml; charset="utf-8"
Content-Length: 1605
<?xml version="1.0" encoding="utf-8"?>
<TargetList xmlns:xsi="http://www.w3.org/2001/XMLSchema-instance"
    xmlns:xsd="http://www.w3.org/2001/XMLSchema"
    xmlns:xlink="http://www.w3.org/1999/xlink"
    xmlns="http://www.objectvideo.com/schemas/ovready">
<Timestamp>2007-03-12T12:29:02.222</Timestamp>
<ChannelInfo xlink:type="simple"
        xlink:href="/api.rest/channel/0">
<ID>0</ID>
</ChannelInfo>
<Targets>
<Target>
    <TargetID>135038</TargetID>
    <BoundingBox>
    <X>0.728125</X>
    <Y>0.9041667</Y>
    <Width>0.06875</Width>
    <Height>0.0541666</Height>
    </BoundingBox>
    <Classification>Human</Classification>
    <EqualID>135038</EqualID>
    <Parents>
    <ParentID>135033</ParentID>
    <ParentID>135025</ParentID>
    </Parents>
</Target>
</Targets>
</TargetList>
----ovready
...
```

9. Metadata Output

Output of metadata for each channel may be supported. The DeviceConfiguration may specify whether this may be supported by the device. This metadata may be binary data that contains all the information that was analyzed by for each frame regardless of the rules that were active at the time. The metadata may be then used to search for specific events.

Metadata may be generated on a frame by frame basis. To be able to capture all this data, Metadata streaming using multi-part MIME may be used.

An example of the metadata stream may be:

```
MIME-Version: 1.0
Content-Type: multipart/mixed; boundary="--ovready"
----ovready
Content-Type: application/octet-stream
Content-Length: 1605
X-OVReady-Timestamp: 2007-03-15T16:51:44.444
X-OVReady-Device-ID: device-294826
X-OVReady-Channel-Location: http://server/api.rest/channels/0
X-OvReady-View-ID: view001
<binary data>
----ovready
Content-Type: application/octet-stream
Content-Length: 1605
X-OvReady-Timestamp: 2007-03-15T16:51:44.544
X-OVReady-Device-ID: device-294826
X-OVReady-Channel-Location: http://server/api.rest/channels/0
<binary data>
----ovready
...
```

The Content-Type may always be an octet-stream as the data may be binary.

The Content-Transfer-Encoding can either be x-identity or x-deflate. In either case, the body of this sub-part may be binary. If the Content-Transfer-Encoding header may be not specified, the default x-identity may be assumed.

The Content-Length may be the length of the body.

The X-OVReady-Timestamp may be the time that this metadata was generated at. This may match the corresponding video frame that was analyzed.

The X-OVReady-Device-ID may be the unique identifier of the device that generated the metadata. The X-OVReady-Channel-Location may be the full URI of the channel that generated this metadata. The X-OVReady-View-ID may be the identifier of the view that was in a KnownView status for which this metadata was generated. If the X-OVReady-View-ID may be unknown, this field may be not sent (as in the second example above). The application can use these pieces of information to partition the metadata effectively.

To determine which roles a user has, the user should log into the system and be authenticated.

10. Authentication

The authentication mechanism provides a way to encrypt the user name and password over the network regardless of HTTPS usage. OVSimple works with both browser and non-browser applications. It requires the use of an HTTP cookie in the HTTP header to avoid re-authentication with every request. The following steps explain the mechanism:

When an application requests a resource, a device checks for the existence of a session cookie or an HTTP Authorization header. If the cookie exists and the session may be valid, the authentication has already been performed and the call continues as normal. If the Authorization header exists then the device may try to authenticate the user using the steps outlined below starting in step 2.

If this cookie or Authorization header does not exist or the session has expired, an HTTP status code of 401 may be returned along with one or more WWW-Authenticate headers in the response. In addition, a temporary cookie may be returned in the response header. This temporary cookie value may be referred to as a nonce.

The device looks up the user's password based on the given user name. The device then creates a digest using the same mechanism as the client. It compares this newly created digest with the digest given to it. If they match, an HTTP status code of 200 may be returned to the application along with a new session cookie. The application can then make other calls as needed always passing along the session cookie. The device maintains the session association with this cookie and updates the expiration time on every subsequent request with this cookie. If the password does not match, the device returns to Step 1 again with a new temporary nonce.

To end the user's session, the application can send a DELETE to the /api.rest/users/current/session URI. This may delete the session from the server.

10.1. HTTPBasic Authentication

HTTP Basic authentication may be defined in RFC 2617. The username and password may be encoded but not encrypted and so the password could easily be retrieved. If Basic authentication may be used, it may be recommended that HTTPS be used for additional protection. The following steps explain the mechanism:

When an application requests a resource, a device checks for existence of a session cookie or an HTTP Authorization header. If the cookie exists and the session may be valid, the authentication has already been performed and the call continues as normal. If the Authorization header exists then the device may try to authenticate the user using the steps outlined below starting in step 2.

When a user needs to login, the login name and password may be sent across in the HTTP Authorization header field as a colon-separated, Base64 encoded string. For example, if the login name was "Aladdin" and the password was "open sesame", these values may be first joined to form "Aladdin: open sesame". This may be then Base64 encoded. The actual value sent back in the HTTP header may be: Authorization: Basic QWxhZGRpbjpvcGVuIHNlC2FtZQ==

When the device receives the Authorization header, it starts the process of authentication. The device Base64 decodes the string and obtains the user name and password. The device may then compare this to the stored password under that user name. If they match, an HTTP status code of 200 may be returned to the application along with a session cookie. The application can then make other calls as needed always passing along the session cookie. The device maintains the session association with this cookie and updates the expiration time on every subsequent request with this cookie.

If the hashed values do not match, the device returns to Step 1 again by sending a 401 and WWW-Authenticate header.

11. Device Discovery

Devices can be discovered by manual registration and DNS-Service Discovery (DNS-SD).

11.1. Manual Registration

Manual registration entails providing the user with a mechanism to specify the address of a device. Typically, this would be a URL. As part of the registration, the user could provide the user name and password to the application if needed.

12. XML Streams

Streaming of data to a client over an HTTP connection using the multipart MIME format as detailed in RFC 2046 may be supported. For each of the supported data types, the following steps may be similar.

Upon the initial connection from the requesting application, the device may send back the initial MIME content information as shown in the first two lines below.

MIME-Version: 1.0
Content-Type: multipart/mixed; boundary="--ovready"

Then for each item to be streamed, an '----ovready' delimited section may be returned on the existing connection.

```
----ovready
Content-Type: application/xml; charset="utf-8"
Content-Length: 126
<?xml version="1.0" encoding="utf-8"?>
<Foo>
<Name>SomeName</Name>
<ID>ID0001</ID>
<Etc>etc.etc.etc.</Etc>
</Foo>
```

So for multiple items it would look like:

----ovready

```
Content-Type: application/xml; charset="utf-8"
Content-Length: 126
<?xml version="1.0" encoding="utf-8"?>
<Foo>
<Name>SomeName</Name>
<ID>ID0001</ID>
<Etc>etc.etc.etc.</Etc>
</Foo>
----ovready
Content-Type: application/xml; charset="utf-8"
Content-Length: 127
<?xml version="1.0" encoding="utf-8"?>
<Foo>
<Name>OtherName</Name>
<ID>ID0004</ID>
<Etc>etc.etc.etc.</Etc>
</Foo>
```

Occasionally, an optional empty packet (simulating a heartbeat) may be sent by the device to verify that the connection has not been broken. This should only be sent after a period of inactivity.

```
----ovready
Content-Type: application/xml; charset="utf-8"
Content-Length: 0
```

XML Stream Encoding

In order to be flexible in different computing and networking environments, XML data streams may be encoding in several ways. The specification of which encoding mechanism may be used follows the multi-part MIME standard, whereby the client requests a certain type of encoding through the X-MIME-Encoding header. The valid values supported by the device may be listed in the Device Configuration. All devices support the x-identity encoding, which may be the default encoding if no encoding may be provided The list of valid stream encodings may be shown below. If the X-MIME-Encoding header specifies any other value or if the value specified may be not supported by the device, no encoding may be done.

x-identity—the data may be not modified. This may be the default.

x-deflate—the XML data compressed with zlib compression.

x-xml-token—the XML data split into tokens for smaller transmissions.

x-xml-token-deflate—the x-xml-token encoded data compressed with zlib compression.

Currently, these values only apply to the following URIs:

[channel root]/eventstream (only x-identity and x-deflate allowed)

[channel root]/targetstream

[channel root]/targets

[channel root]/metadata (only x-identity and x-deflate allowed)

Client Request

When requesting resource, the client can specify which encoding to be returned with the X-MIME-Encoding header. For example, a client requesting the target stream with compression may look like:

```
GET [channel root]/targetstream HTTP/1.1
Host: [server]
Accept: application/xml
X-MIME-Encoding: x-deflate
```

Note that if the client wishes to use the x-identity encoding, the X-MIME-Encoding header does not need to be sent.

12.1 Device Response

When the device receives the X-MIME-Encoding for one of the supported URIs, the device may reflect the current encoding type in the Content-Transfer-Encoding field of the multi-part MIME header. If the X-MIME-Encoding may be invalid or unsupported, no encoding may be used.

For example, if a client requested the target stream with compression (x-deflate encoding), the device may return something like:

```
HTTP/1.1 200 OK
MIME-Version: 1.0
Content-Type: multipart/mixed; boundary="--ovready"
----ovready
Content-Type: application/xml
Content-Transfer-Encoding: x-deflate
Content-Length: [size1]
 [Compressed target tracking data]
----ovready
Content-Type: application/xml
Content-Transfer-Encoding: x-deflate
Content-Length: [size2]
 [Compressed target tracking data]
```

Note that the [Compressed target tracking data] may be binary data.

For those supported non-streaming APIs, a similar approach may be followed. For example, if a client requested the current targets with compression (x-deflate encoding), the device may return something like:

```
HTTP/1.1 200 OK
Content-Type: application/xml
Content-Transfer-Encoding: x-deflate
Content-Length: [size]
 [Compressed target tracking data]
```

12.2 XML-Token Encoding

The x-xml-token encoding may be a way to reduce the size of XML data yet still provide a textual format for easy reading and parsing. It retains the metadata about the object types of the XML but removes much of the redundant text. It may be positioned to handle XML data that may be very consistent and repetitive and can achieve reductions in size of 70% or more. This data can be further compressed with zlib by specifying xml-token-deflate. An example of this type of data may be target information that can be retrieved from the device.

The xml-token encoding scheme may be comprised of two parts: XML template and XML tokens.

12.3 XML Template

On a request to a URI with X-MIME-Encoding: x-xml-token, the device may first return an XML template that defines the general form of the data. This may be sent once per request and so for asynchronous streaming operations, it may be sent at the initial request. The template may contain only the text that may be static and all dynamic strings may be replaced with %s, which may be the printf format specifier for strings. For example, the target data template would be:

```
1 <?xml version="1.0" encoding="utf-8"?>
2 <TargetList xmlns:xsi="http://www.w3.org/2001/XMLSchema-instance"
        xmlns:xsd="http://www.w3.org/2001/XMLSchema"
        xmlns:xlink="http://www.w3.org/1999/xlink"
        xmlns="http://www.objectvideo.com/schemas/ovready">
        <Timestamp>%s</Timestamp>
        <ChannelInfo xlink:href="/api.rest/channels/%s">
        <ID>%s</ID>
        </ChannelInfo>
        <Targets>
        <Target>
        <TargetID>%s</TargetID>
        <BoundingBox>
        <X>%s</X>
        <Y>%s</Y>
        <Width>%s</Width>
        <Height>%s</Height>
        </BoundingBox>
        <Classification>%s</Classification>
        <Parents>
        <ParentID>%s</ParentID>
        </Parents>
        <EqualID>%s</EqualID>
        </Target>
        </Targets>
        </TargetList>
```

Each line of the template has a line number, followed by a space, followed by a line of text. Currently, the text can have at most one %s value to be replaced.

Note that a TargetList can contain more than one target and so the Target definition (lines 11-24) would be repeated for each target. Each Target can have more than one parent and so the ParentID property (line 21) would be repeated multiple times within the Parents property. Alternatively, the Parents property could be empty, whereby these lines (20-22) would not exist. In each of these cases, the XML tokens data takes this into account.

12.4 XML Tokens

After the XML template may be returned to the client, the device then formats the specific XML data to fit that template. The format of the XML tokens data may be line number (referring to the XML template) and a replacement for that line, if any, preceded by a space. To recreate the original XML document, the client iterates over the XML tokens data line by line. For each line number listed in the tokens data, the corresponding XML template line may be used. If the tokens data contains a replacement value, it may be inserted in place of the %s from the XML template line.

For example, the XML token data associated with the previous template may be:

```
1
2
3
4
5
6 2007-03-12T12:29:02.222
7 0
8 0
9
10
11
12 135038
13
14 0.7281250
15 0.9041667
16 0.0687500
17 0.0541666
18
19 Human
20
```

```
21 135033
21 135025
22
23 135038
24
25
11
12 135039
13
14 0.4381250
15 0.8941667
16 0.0487500
17 0.0741666
18
19 Vehicle
23 135035
24
25
26
```

The example above shows a single TargetList with two Targets. The first Target starts at the first line "10" and continues to the first line "24". This Target has two ParentIDs, each reference preceded by line "20". The second Target, starts with the second line "10" and continues to the second line "24". It contains no ParentIDs, hence lines 19-21 do not appear in the second Target definition.

12.5 Putting it Together

This example walks through when the client requests the x-xml-token encoding. The client requests:

```
GET  [channel root]/targetstream HTTP/1.1
Host: [server]
Accept: application/xml
X-MIME-Encoding: x-xml-token
```

The device will first respond first with the template:

```
HTTP/1.1 200 OK
MIME-Version: 1.0
Content-Type: multipart/mixed; boundary="--ovready"
----ovready
Content-Type: application/xml
Content-Transfer-Encoding: x-xml-token
Content-Length: 735
1 <?xml version="1.0" encoding="utf-8"?>
2 <TargetList xmlns:xsi="http://www.w3.org/2001/XMLSchema-instance"
3     xmlns:xsd="http://www.w3.org/2001/XMLSchema"
4     xmlns:xlink="http://www.w3.org/1999/xlink"
5     xmlns="http://www.objectvideo.com/schemas/ovready">
6 <Timestamp>%s</Timestamp>
7 <ChannelInfo xlink:href="/api.rest/channels/%s">
8 <ID>%s</ID>
9 </ChannelInfo>
10 <Targets>
11 <Target>
12 <TargetID>%s</TargetID>
13 <BoundingBox>
14 <X>%s</X>
15 <Y>%s</Y>
16 <Width>%s</Width>
17 <Height>%s</Height>
18 </BoundingBox>
19 <Classification>%s</Classification>
20 <Parents>
21 <ParentID>%s</ParentID>
22 </Parents>
23 <EqualID>%s</EqualID>
24 </Target>
25 </Targets>
26 </TargetList>
```

And then (assuming the same connection), the device will send out XML tokens data whenever present:

```
----ovready
Content-Type: application/xml
Content-Transfer-Encoding: x-xml-token
Content-Length: 311
1
2
3
4
5
6 2007-03-12T12:29:02.222
7 0
8 0
9
10
11
12 135038
13
14 0.7281250
15 0.9041667
16 0.0687500
17 0.0541666
18
19 Human
20
21 135033
21 135025
22
23 135038
24
25
11
12 135039
13
14 0.4381250
15 0.8941667
16 0.0487500
17 0.0741666
18
19 Vehicle
23 135035
24
25
26
----ovready
Content-Type: application/xml
Content-Transfer-Encoding: x-xml-token
Content-Length: [size]
...
```

Embodiments of the invention may take forms that include hardware, software, firmware, and/or combinations thereof. Software may be received by a processor from a computer-readable medium, which may, for example, be a data storage medium (for example, but not limited to, a hard disk, a floppy disk, a flash drive, RAM, ROM, bubble memory, etc.), or it may be received on a signal carrying the software code on a communication medium, using an input/output (I/O) device, such as a wireless receiver, modem, etc. A data storage medium may be local or remote, and software code may be downloaded from a remote storage medium via a communication network.

The examples and embodiments described herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

The invention claimed is:

1. A communication system comprising:
a device with video analytics capability;
an application running on a computer, the device and the application communicating with each other via a physical network, the application discovering video analytics devices, authenticating the discovered video analytics devices, and obtaining software capabilities of a video analytics device;
a communication layer independent of and disposed between the device and the application and having a video analytics communication protocol and an application program interface, the video analytics communication protocol including:
protocol data,
device configuration data comprising information about the video analytics supported by the device and including video analytics output formats,
channel configuration data comprising information about each video analytics channel on the device and including a list of video analytics channels and supported video analytics capabilities for each channel,
event output data,
user management data, and
video analytics metadata output data comprising metadata generated by the device and including target descriptions for targets detected and output mechanisms.

2. The communication system of claim 1, wherein the protocol data comprises information regarding the capabilities of the communication protocol including supported data formats, transports, and authentication mechanisms.

3. The communication system of claim 1, wherein the communication protocol further includes view management data.

4. The communication system of claim 3 wherein the view management data comprises a list of views for the device.

5. The communication system of claim 1, wherein the rule management data comprises information regarding rules for a channel.

6. The communication system of claim 1, wherein the event output data comprises an alert or a count.

7. The communication system of claim 1, wherein the communication protocol further includes user management data comprising authentication and authorization information for a user.

8. The communication system of claim 1, wherein the metadata output data comprises data regarding targets detected by the device.

9. The communication system of claim 1, wherein the physical network is one of socket-based or peripheral-based.

10. The communication system of claim 1, wherein the communications layer is one of HTTP, SIP, or SNMP.

11. The communication system of claim 1, wherein the API is one of XML, SOAP, JSON, or Binary.

12. A method for communication between a device with video analytics capability and an application running on a computer, the device and the application sending messages to each other via a physical network, the method comprising:
discovering video analytics devices;
authenticating the discovered video analytics devices;
obtaining software capabilities of a video analytics devices;
disposing a communication layer between the device and the application and having a video analytics protocol and an application program interface, the communication layer being independent of the physical network; and
sending the messages between the device and the application using the video analytics protocol, the messages including protocol data, device configuration data comprising information about the video analytics supported by the device and includes video analytics output formats, channel configuration data comprising information about each video analytics channel on the device including a list of video analytics channels and supported video analytics capabilities for each channel, rule management data, event output data, and video analytics metadata output data comprising metadata generated by the device and including target descriptions for targets detected and output mechanisms defined according to the communication protocol.

13. The communication method of claim 12, further comprising analyzing the metadata to determine events that occurred during post real-time analysis.

14. A method for communication in a video analytics system including a plurality of devices, the method comprising:
discovering video analytics devices;
authenticating the discovered video analytics devices;
obtaining software capabilities of a video analytics devices;
sending a message from a device to other devices in the system via a video analytics protocol independent of the system, the message including protocol data, device configuration data comprising information about the video analytics supported by the device, including video analytics output formats, channel configuration data comprising information about each video analytics channel on the device, including a list of video analytics channels and supported video analytics capabilities for each channel, rule management data, event output data, and video analytics metadata output data comprising metadata generated by the device and including object descriptions for objects detected and output mechanisms;
receiving at the device messages from other devices in the system via a video analytics protocol independent of the system, the received message including protocol data, device configuration data comprising information about the video analytics supported by the device, including video analytics output formats, channel configuration data comprising information about each video analytics channel on the device, including a list of video analytics channels and supported video analytics capabilities for each channel, rule management data, event output data, user management data, and video analytics metadata output data comprising metadata generated by the device and including object descriptions for objects detected and output mechanisms; and setting up the system of devices based on the exchanged messages.

15. A non-transitory computer-readable medium comprising software that, when executed by a computer, causes the computer to perform a method comprising:
discovering video analytics devices;
authenticating the discovered video analytics devices;
obtaining software capabilities of a video analytics device including:
obtaining information regarding the protocol supported by the device;

obtaining information regarding the device configuration comprising information about the video analytics supported by the device, including video analytics output formats;
   obtaining information regarding any channels of the device comprising information about each video analytics channel on the device, including a list of video analytics channels and supported video analytics capabilities for each channel;
   obtaining information regarding views provided by the device; and
   obtaining information regarding rules defined for the device;
receiving an output from the video analytics device, including
   outputting information regarding events detected by the device;
   outputting information regarding targets tracked by the device; and
   outputting information used in frame analysis; and
sending the output to a user device,
wherein a communication layer is independent of and disposed between the devices and the computer and having a video analytics communication protocol and an application program interface, the video analytics communication protocol.

16. A system, comprising:
   a plurality of video analytics devices which capture and manipulate video data;
   a plurality of user devices;
   an application running on a computer, the devices and the application communicating with each other via a physical network, the application discovering video analytics devices, authenticating the discovered video analytics devices, and obtaining software capabilities of a video analytics device; and
   an interface which couples any one of the plurality of video analytics devices to any one of the plurality of user devices, the interface being independent of the user device and video analytics devices transmitting protocol data, device configuration data comprising information about the video analytics supported by the device, including video analytics output formats, channel configuration data comprising information about each video analytics channel on the device, including a list of video analytics channels and supported video analytics capabilities for each channel, rule management data, event output data, and metadata output data comprising metadata generated by the device and including object descriptions for objects detected and output mechanisms between any one of the plurality of video analytics devices to any one of the plurality of user devices.

* * * * *